US007487077B1

(12) United States Patent
Clune et al.

(10) Patent No.: US 7,487,077 B1
(45) Date of Patent: Feb. 3, 2009

(54) MODELING DELAY USING A DISCRETE EVENT EXECUTION MODELING ENVIRONMENT

(75) Inventors: Michael I. Clune, Natick, MA (US); Andrew Grace, Sherborn, MA (US); Murali Yeddanapudi, Watertown, MA (US); Ramamurthy Mani, Needham, MA (US); Pieter J. Mosterman, Framingham, MA (US); Atul Suri, Watertown, MA (US)

(73) Assignee: The MathWorks, Inc., Natick, MA (US)

(*) Notice: Subject to any disclaimer, the term of this patent is extended or adjusted under 35 U.S.C. 154(b) by 514 days.

(21) Appl. No.: 11/021,511

(22) Filed: Dec. 22, 2004

Related U.S. Application Data

(60) Provisional application No. 60/611,571, filed on Sep. 20, 2004, provisional application No. 60/611,572, filed on Sep. 20, 2004.

(51) Int. Cl.
*G06G 7/62* (2006.01)

(52) U.S. Cl. .......... 703/17; 716/6

(58) Field of Classification Search .......... 703/17, 703/19, 21, 16; 716/3, 6
See application file for complete search history.

(56) References Cited

U.S. PATENT DOCUMENTS 4,985,860 A 1/1991 Vlach
5,371,851 A * 12/1994 Pieper et al. .......... 345/501
5,452,239 A * 9/1995 Dai et al. .......... 703/19
6,286,126 B1 * 9/2001 Raghavan et al. .......... 716/6
6,445,707 B1 * 9/2002 Iuoras et al. .......... 370/395.43
6,732,341 B1 * 5/2004 Chang et al. .......... 716/6
7,131,877 B1 * 11/2006 Staerzl .......... 440/76
2002/0169658 A1 * 11/2002 Adler .......... 705/10
2003/0079207 A1 * 4/2003 Xavier et al. .......... 717/135

OTHER PUBLICATIONS

Anylogic User's Manual. *XJ Technologies Company Ltd.* 1992-2004; pp. 2-4, 8-9, 21-23, 41-43, 55-57, 155-156, 218-221, 270-271.

Clune, M., et al. Panel session on "Challenges and solution techniques for hybrid simulation." 43rd IEEE Conference on Decision and Control, Dec. 14, 2004.

Fall, K., et al. "The *ns* manual (formerly *ns* notes and documentation)." *The VINT Project*. Apr. 14, 2005; Chapters 4-8, pp. 37-85; Chapter 11, pp. 110-114.

Fujimoto, R. "Parallel discrete event simulation." *Communications of the ACM*. Oct. 1990; 1-8.

(Continued)

*Primary Examiner*—Paul L Rodriguez
*Assistant Examiner*—Andre Pierre Louis
(74) *Attorney, Agent, or Firm*—Lahive & Cockfield, LLP; Kevin J. Canning

(57) ABSTRACT

A discrete event system (DES) modeling environment models the occurrence of events independent of continuous model time. In a DES modeling environment, state transitions depend not directly on time, but rather aperiodic discrete incidents known as events. A discrete event modeling environment can be used to model a control system using one or more discrete event-driven components. The event-driven components can be used to model certain portions of a control system that cannot be accurately modeled using a time-based model.

30 Claims, 20 Drawing Sheets

OTHER PUBLICATIONS

"Fundamentals of VHDL-AMS for high-speed buffer modeling." *Mentor Graphics Corporation*. 2002; 1-62.
"Graphical design environment for CAMeL-Tools." http://wwwcs.uni-paderborn.de/SFB376/projects/c1/Paper/vcamel.html. Sep. 18-20, 1996; 1-10.
Haverinen, A., et al. "White paper for SystemC™ based SoC communication modeling for the OCP™ protocol." Oct. 14, 2002; 1-39.
Henricksson, D., et al. "TrueTime 1.2—Reference Manual." Oct. 2004; 7-79.
Holz, E. "SDL-2000 Tutorial." *Formal Methods Europa*. Mar. 2001; 1-49.
Liu, J., et al. "Component-based hierarchical modeling of systems with continuous and discrete dynamics." *CACSD'00*. Sep. 25, 2000; 1-11.
Liu, J., et al. "Actor-oriented control system design: A Responsible framework perspective." *IEEE Transactions on Control Systems Technology*. Mar. 2004; 12(2):250-62.
Liu, J., et al. "Motivating hierarchical run-time models for measurement and control systems." *Ptolemy Miniconference*, Berkeley, CA. Mar. 22-23, 2001; 1-3.
Liu, J., et al. "System-level modeling of continuous and discrete dynamics." *Ptolemy Miniconference*, Berkeley, CA. Mar. 22-23, 2001; 1-4.
Martin, D.E., et al. "Analysis and simulation of mixed-technology VLSI systems." *Journal of Parallel and Distributed Computing*. 2002; 62:468-93.
Martin, R.C. "UML tutorial: Sequence diagrams." *Engineering Notebook Column*. Apr. 1998; 1-5.
Murata, T. "Petri nets: Properties, analysis and applications." *Proceedings of the IEEE*. Apr. 1989; 77(4):541-80.
Overhauser, D., et al. "Evaluating mixed-signal simulators." *IEEE*. 1995; 113-20.
Overhauser, D., et al. "IDSIM2: An Environment for mixed-mode simulation." *IEEE*. 1990; 5.2.1-4.
System C Version 2.0 Users Guide. "Update for SystemC 2.0.1." 1996-2002; Chapter 1, pp. 1-8; Chapter 2, pp. 9-38; Chapter 5, pp. 71-82.
"The Almagest. Vol. 1—Ptolgemy 0.7 User's Manual." *Ptolemy*. Mar. 3, 1997; Sections 1.4-1.9, 2.5-2.8, 4.9, 9.1-9.5, 12.1-12.4, 16.1, 16.3.
Vlach, M. "Modeling and simulation with Saber." *IEEE*. 1990; T-11.1-11.9.
Zeigler, B.P., et al. "Creating simulations in HLA/RTI using the DEVS modeling framework." *DEVS/HLA Tutorial*. 1998; 1-18.

* cited by examiner

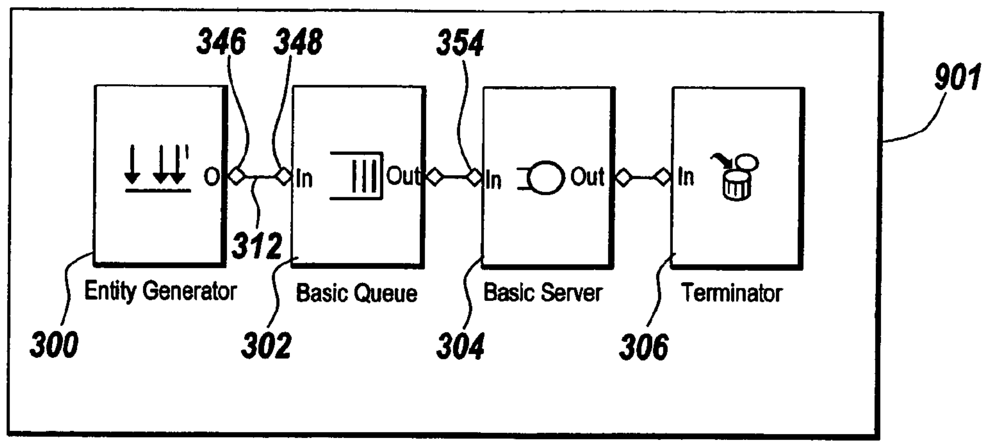
*Fig. 8*
900
| Time of Event (s) | Type of Event |
|---|---|
| 0.9 | Entity Generator block generates an entity |
*Fig. 9*
902
| Time of Event (s) | Type of Event |
|---|---|
| 1.7 | Entity Generator block generates second entity |
| 2.2 | Basic Server block completes service on the first entity |
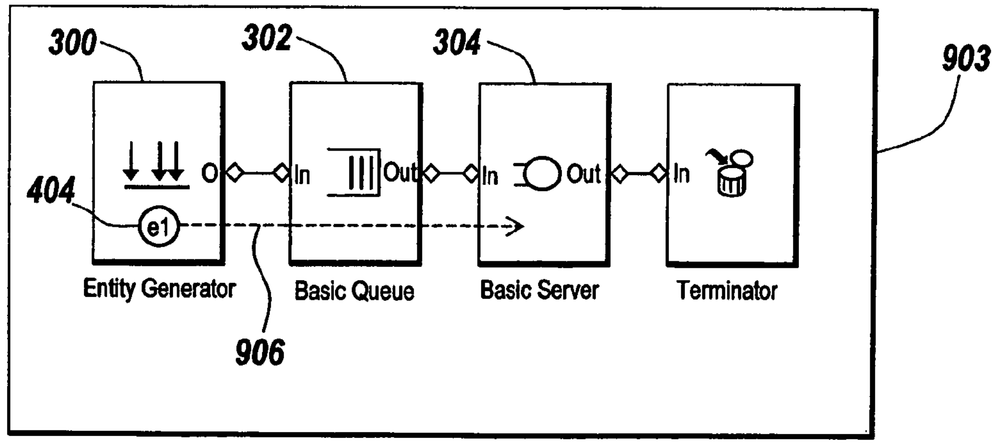
*Fig. 10*

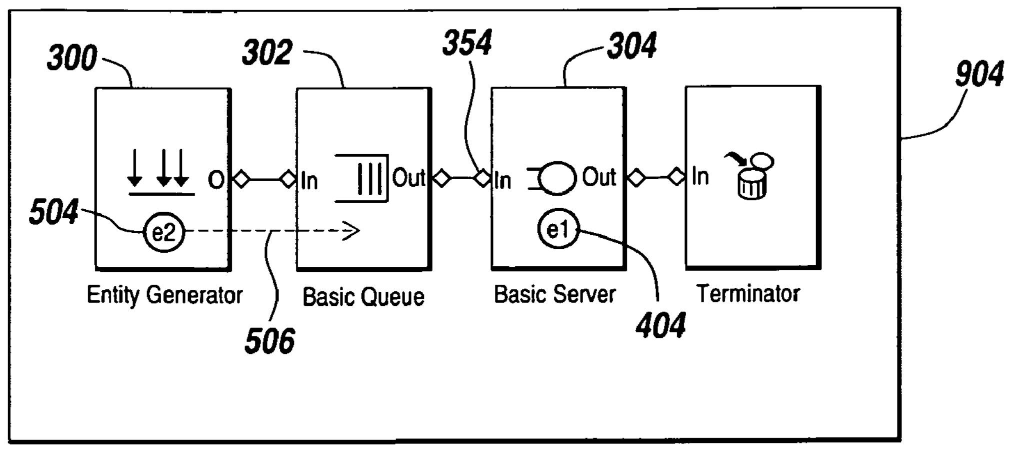
*Fig. 11*
905
| Time of Event (s) | Type of Event |
|---|---|
| 2.2 | Basic Server block completes service on the first entity |
| 3.8 | Entity Generator block generates the third entity |
*Fig. 12*
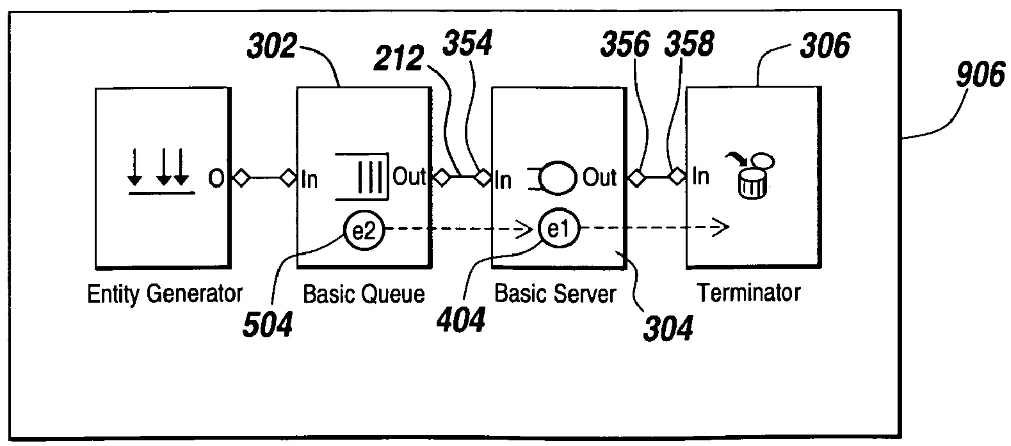
*Fig. 13*

904

| Time of Event (s) | Type of Event |
|---|---|
| 3.8 | Entity Generator block generates the third entity |
| 4.2 | Basic Server block completes service on the second entity |

906

| Time of Event (s) | Type of Event |
|---|---|
| 3.9 | Entity Generator block generates the fourth entity |
| 4.2 | Basic Server block completes service on the second entity |

909

| Time of Event (s) | Type of Event |
|---|---|
| 4.2 | Basic Server block completes service on the second entity |
| 6 | Entity Generator block generates the fifth entity |

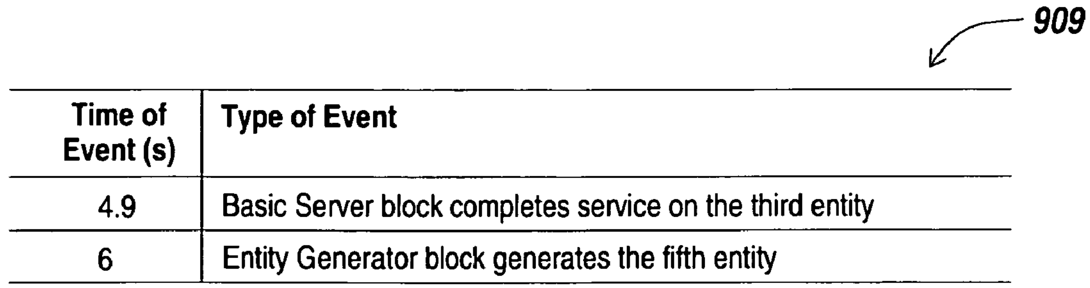

| Time of Event (s) | Type of Event |
|---|---|
| 4.9 | Basic Server block completes service on the third entity |
| 6 | Entity Generator block generates the fifth entity |

*Fig. 19*

| Time of Event (s) | Type of Event |
|---|---|
| 2.1 | Entity Generator block generates the first entity |
| 2.1 | Entity Generator block generates the second entity |
| 2.3 | Basic Server block completes service |

*Fig. 20a*

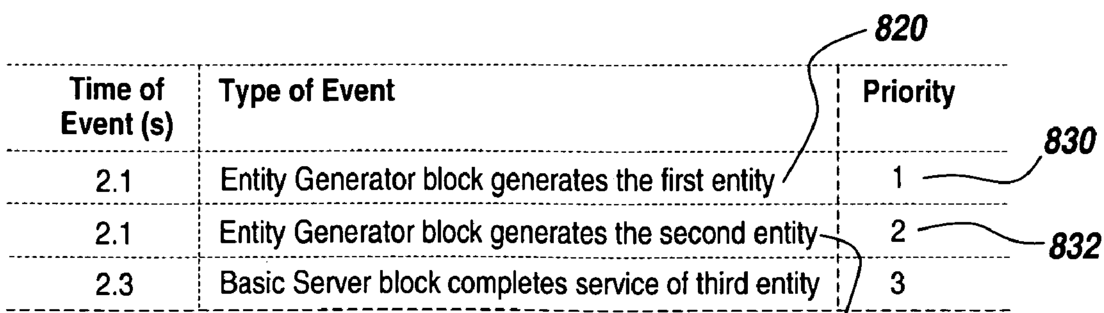

| Time of Event (s) | Type of Event | Priority |
|---|---|---|
| 2.1 | Entity Generator block generates the first entity | 1 |
| 2.1 | Entity Generator block generates the second entity | 2 |
| 2.3 | Basic Server block completes service of third entity | 3 |

*Fig. 20b*

MODELING DELAY USING A DISCRETE EVENT EXECUTION MODELING ENVIRONMENT

RELATED APPLICATIONS

The present application claims priority to U.S. Provisional Patent Application Ser. No. 60/611,572, entitled "Modeling Feedback Loops Using a Discrete Event Simulation Modeling Environment", filed Sep. 20, 2004 and U.S. Provisional Patent Application Ser. No. 60/611,571, filed on Sep. 20, 2004, entitled "Method and System for Transferring Data Between a Discrete Event Simulation Environment and an External Environment", the contents of both of which are herein incorporated by reference.

FIELD OF THE INVENTION

The present invention relates to modeling of discrete or time events using a graphical modeling system. More particularly, the present invention relates to configuring parameters of a block in a graphical model used to model discrete time events.

BACKGROUND OF THE INVENTION

Generally, graphical analysis, simulation, and execution methods are used in modeling, design, analysis, and synthesis of engineered systems. These methods provide a visual representation of a model, such as a block diagram. The visual representation provides a convenient interpretation of model components and structure. The visual representation also provides a quick intuitive notion of system behavior. The components of a block diagram can also capture the mathematical representation of the actual system being modeled.

Historically, time-based block diagram models have been used in scientific areas, such as Feedback Control Theory and Signal Processing. Time-based block diagrams are used to study, design, debug, and refine dynamic systems representative of many real-world systems. A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, and the like.

Professionals from diverse areas such as engineering, science, education, and economics build mathematical models of dynamic systems to better understand system behavior as it changes with the progression of time. The mathematical models aid in building better systems, which can be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may serve to educate users on the basic principles governing physical systems. The models and results are often used as a scientific communication medium between humans. The term "model-based design" refers to the use of models, often graphical, in the analysis, development, validation, and operation of dynamic systems.

Dynamic systems are typically modeled in modeling environments as sets of differential, difference, and/or algebraic equations. At any given instant of time, these equations may be viewed as relationships between the system's output response ("outputs"), the system's input stimuli ("inputs") at that time, the current state of the system, the system parameters, and time.

Time-based block diagram modeling has become particularly attractive over the last few years with the advent of software packages to process large amounts of data and perform a high number of computational iterations. In fact, various classes of graphical models enable a user to describe a system and related computations that can be performed on application specific computational hardware, such as a computer, microcontroller, FPGA, or custom hardware. Classes of such graphical models include time-based block diagram execution applications such as Simulink® from the MathWorks, Inc. Natick Mass., and state-based flow diagram execution applications such as Stateflow® from the MathWorks, Inc. Natick Mass., in addition to other models such as data flow diagrams, Unified Modeling Language (UML) models, VHDL models, analog extension models, and the like.

A common characteristic among these various forms of model execution applications is that they define semantics of how to execute the model diagram, and thus they specify how to model a dynamic system. Such applications provide sophisticated software platforms with a rich suite of support tools that make the analysis and design of dynamic systems efficient, methodical, and cost-effective. Furthermore, such applications can support the modeling of linear and nonlinear systems. These systems may be modeled in continuous time, sampled (or discrete) time, or a hybrid of continuous and discrete time. Systems can also be multirate, i.e., have different parts that are sampled or updated at different rates.

Time can be an inherited component of model diagram execution applications in that the results of a model diagram execution are dependent on time and as such, vary with time. In other words, a model diagram execution or model represents the instantaneous behavior of a dynamic system and models that system over time. Determining a system's behavior over time requires repeatedly executing a model of the system at intervals, called time steps, from the start of the time span to the end of the time span.

Systems may be categorized by the type of time step being used (fixed-step or variable-step). A fixed-step system is one that uses a fixed-step solver. A variable-step system is one that uses a variable-step solver. A solver is a module of the execution engine that is responsible for performing two tasks: (1) determining how far execution time should be advanced between consecutive passes through a system in order to accurately trace the system's outputs, and (2) integrating the derivative of the states of the system to obtain the actual states. Based on how solvers perform the first task, they are generally classified into two basic classes: Fixed-step solvers or Variable-step solvers. Fixed-step solvers often use explicit methods to compute the next continuous state at fixed periodic intervals of time. A variable-step solver can use either implicit or explicit methods to compute the next continuous state at non-periodic intervals of time. Generally, variable-step solvers use a form of error control to adjust the interval size such that the desired error tolerances are achieved.

Solvers can also be categorized into two classes with respect to time: continuous-time solvers and discrete-time solvers. Continuous-time solvers use numerical integration to compute a model's continuous states at the current time step from the states at previous time steps and the state derivatives. Continuous-time solvers rely on the model's blocks to compute the values of the model's discrete states at each time step. Mathematicians have developed a wide variety of numerical integration techniques for solving the ordinary differential equations (ODEs) that represent the continuous states of dynamic systems. Continuous-time solvers can further be separated into fixed-step continuous-time solvers and variable-step continuous-time solver. Discrete-time solvers exist primarily to solve purely discrete models. They compute the next execution time step for a model and nothing else. Discrete-time solvers do not compute continuous states and they rely on the model's blocks to update the model's discrete states. Similarly, discrete-time solvers can also be further separated into fixed-step discrete-time solvers and variable-step discrete-time solvers.

Simulink® is an example of an interactive graphical modeling tool that enables users to quickly create, model, simulate, and test block diagram representations of dynamic systems. Simulink® uses time-dependent models. It is suitable for simulating time-varying systems. FIG. 1 shows an example of a Simulink® model. The Simulink® model makes use of blocks and arrows to connect the blocks, when forming the model. Each arrow connecting one enabled block to another represents a signal having a value at all times. The arrow indicates which blocks read from the signal and write to the signal as the signal varies with time.

In time-based models, in order to know what happens with the system at a specific time in the future (such as at time equals 1000 seconds) the model must be initiated at a time of n seconds, where n is less than 1000 and the behavior at time n is known, and stepped through time to arrive at the 1000 second mark. For example, the model can be executed as follows in accordance with one example implementation embodiment. Input signal 100 generates an input signal. Link 114 connects the signal from the Integrator block 104 as determined by the state of the Integrator block 104 to a Scope block 108 for display, and also connects the signal to Gain block 106 through 114. At execution start time, the state of the Integrator block 104 has a user-defined initial value or a default initial value. Gain block 106 performs calculation on the input signal from link 114 and outputs the result on link 116 that connects to the Sum block 102. Sum block 102 adds the signal from link 110 and link 116 and outputs the result in the form of link 112. Integrator block 104 takes the signal from link 112 and performs integration on the input signal and updates its state accordingly. The model continues on operating on the updated state until a predetermined condition is achieved, a time period is attained, or the user interrupts the execution.

Dynamic systems can also be modeled from a state-based perspective. The state of the system may be thought of as a symbolic representation of the dynamically changing configuration of the system. For instance, in a model of a perfect nonelastic collision between two bodies, the state may be viewed as either the configuration where the two bodies are separated or the configuration where they are in contact. The system parameters are the numerical representation of the static, or unchanging, configuration of the system and may be viewed as constant coefficients in the equations modeling the system. For the nonelastic collision example, a parameter is the mass of one of the bodies.

Stateflow® is an example of a state-based dynamic system modeling application. Stateflow® is configured as a tool in Simulink® that can be used to design embedded systems that contain control, supervisory, or mode logic. By using Stateflow® with Simulink®, users can create models that combine state transition behavior (for example, fault detection or mode switching) with algorithmic continuous-time and discrete-time behavior (for example, feedback control or signal conditioning). Users can also create a model of the system and its environment in Simulink® and run hybrid executions to study the interactions between the two.

In Simulink®, a Stateflow® block uses a state transition diagram to represent an object with a discrete set of modes. These modes are known as states. A Stateflow® chart is a graphical representation of a finite state machine where states and transitions form the basic building blocks of the system. Stateflow® charts enable the graphical representation of hierarchical and parallel states and the event-driven transitions between them. The Stateflow® finite state machine reacts to events by changing states for the controlled object. A controlled object can be a motor, a pump, or any device that changes its behavior in response to external stimuli. The behavior of the object depends on what state the object is in and how the object changes from one state to another.

In the specific example application Stateflow®, the modeling process for modeling state-based executions, is embedded in Simulink®. Thus, the execution is invoked by Simulink® or some other time based dynamic modeling application, and does not run independently. In the case of Stateflow®, as execution starts, Simulink® starts its clock. When the execution engine reaches a Stateflow® block, the Simulink® clock stops evolving, and the execution engine passes information to Stateflow®, and awaits a signal back from Stateflow®. Stateflow® then performs its state-based modeling process. Once all the Stateflow® blocks finish their execution, outputs are sent to Simulink®, and the Simulink® clock starts ticking again. Therefore, during the execution of Stateflow® blocks, the execution is instantaneous, i.e., has no time effect on the Simulink® model. All the events and state transitions that occur in Stateflow® are considered to have taken place at the specific moment in time when the clock stops.

An example of a Stateflow® form of a state diagram model is shown in FIG. 2. Each arrow in the Stateflow® diagram also has values like the Simulink® arrows, but these values represent a decision value relating information that can cause one state to transition to another. The arrows in Stateflow® indicate the direction of the state transition. The exemplar Stateflow® diagram as shown in FIG. 2 is embedded in a Simulink® environment as shown in FIG. 3. The Simulink® signals are provided to Stateflow®, and Stateflow® uses this information to decide whether there are changes in states.

More specifically, in operation, a state flowchart 136 diagram is shown in FIG. 2, which corresponds to a detailed description of the flowchart 136 shown in FIG. 3. In FIG. 3, port data temp 158 receives a signal from the output of physical plant 146. Port temp_min 156 receives a value from a constant block 144 in Simulink® as the minimum set point temperature for the physical plant. Data switch 150 receives data from Simulink® constant block 140 or 142 indicating whether the switch should be on or off. Output port speed 160 on the stateflowchart is then calculated based on input values 154, 156, and 158. Physical plant 146 receives data from output port speed 160 for further calculations within the physical plant 146. Within the state flowchart 136 as shown in FIG. 2, there are two states: an on state 120 and an off state 122. The default transition 126 determines that the initial state is the off state 122. When an on_switch transition 130 is enabled, the enable transition passes to junction 124 and determines whether the temp 158 data is greater or equal to 30, if not, then the enable transition is passed on to transition

132 and further finish the transition to the on state 120. Now the on state 120 is active and off state 122 inactive. The off state 122 will become active again when the off_switch transition 128 is enabled, at which time the on state 120 will become inactive.

One notable difference between Simulink® (and similar dynamic modeling programs) and Stateflow® (and similar state modeling programs) is that Stateflow® models state changes in response to discrete events and is implemented within the time-driven environment, whereas Simulink® is modeled in continuous time or discrete time and is the time-driven environment. Said differently, Simulink® is a time-driven engine and Stateflow® is an event-driven engine embedded and initiated in a time-driven environment.

Dynamic systems are typically modeled in execution environments as sets of equations. At any given instant of time, the equations output values that can be considered states, and can also be communicated to state flow modelers. Thus, users conventionally have the ability to model using time-driven equations, and/or event-driven models controlled by time-driven equations. For example, if a user wants to know how fast a school bus is traveling at a specific moment in time, the user can use Simulink® to model the speed of the school bus. If part of the determination of the speed is what gear the school bus transmission is in, the gear indication can be modeled in Stateflow® within the Simulink® speed model.

Stateflow®, and similar state modeling applications, are therefore utilized when the location and exact behavior of objects are not important but actions taken or completed on or by the objects are of interest. Such state flowchart models are currently invoked by the time driven dynamic modeling environments, such as that of Simulink®. Hence, if only a small number of Stateflow® calls are made by Simulink®, delays can be practically non-noticeable.

However, returning to the school bus example, if the user wants to know in the event of an emergency how fast the school children can get off the school bus, then the user must attempt a highly complex combination of time-driven equations and embedded event-driven models in time-driven environments to approximate the movement of each child off the bus. In Simulink®, such a model will also track the exact position of each child, despite the fact that whether a child has progressed one centimeter forward is not the focus of such a model. Regardless, such information must be tracked in the time dependent graphical model. Also, in such a model, the clock time that each child leaves the bus is unimportant. However, the number of children getting off the bus, the intervals between each child getting off the bus, and the position of the child as either remaining on the bus or being safely off the bus, are what is desired to be modeled. Such events are highly complex to model in time-driven model executions and state-based model executions operating in time-driven environments.

Furthermore, if a user wants to model network traffic and to determine how fast a router can relay millions of packets, it is computationally costly to use the state flowchart model within the dynamic block diagram time driven environment because such a configurations require constant calls between programs. Hence, the delay in execution output can be very noticeable, and can even approach the hardware processing limitations and bog down an execution to the point of ineffectiveness.

Accordingly, a modeling application that is event driven, and does not require a continuous time operation to execute, is desired.

SUMMARY OF THE INVENTION

The present invention provides an event-driven discrete event system (DES) modeling environment for modeling the occurrence of events independent of continuous model time. In an event-driven DES modeling environment, state transitions depend not on time, but rather asynchronous discrete incidents known as events. In one embodiment, an event-driven discrete event execution environment can be used to model a control system using one or more discrete event-driven components. As used herein, a control system may be any system that is used to maintain a desired output or control another system. The event-driven components can be used to model certain portions of a control system that cannot be accurately and efficiently modeled using a time-based model.

According to a first aspect of the invention, a method of modeling a delay in a time-based graphical representation of a control system in a graphical discrete event execution environment is provided. The method comprises a step of providing the time-based graphical representation of the control system including at least one time-driven execution component and a first event-driven execution component for modeling the delay induced in the control system. The first event-driven execution component for modeling a delay is capable of operating on at least one entity holding at least one value of arbitrary data type, and an entity definition is updatable during execution of the graphical representation of the control system. The method further comprises the step of translating a time-based signal to a set of entities in the event driven graphical discrete event execution environment that are operated on by the first event-driven execution component to model the delay. Each generated entity holds at least one value of arbitrary data type. A medium for use in a graphical discrete event modeling and execution environment on an electronic device, the medium holding instructions executable using the electronic device for performing the method for modeling a delay in a time-based graphical representation of a control system is also provided.

According to another aspect of the invention, a method of modeling a delay in a time-based graphical representation of a control system in a graphical discrete event execution environment is provided, which comprises a step of passing a first time-based signal into a first entity generator block. The method further comprises the steps of generating a set of entities, each entity holding at least one value of arbitrary data type, based on the first time-based signal using the first entity generator block, storing the entities in a first storage block, such as a queue block, serving each entity in the storage block or queue for a selected service time using a first server block and updating the first time-based signal based on each entity served by the first server block. A medium for use in a graphical discrete event modeling and execution environment on an electronic device, the medium holding instructions executable using the electronic device for performing the method for modeling a delay in a time-based graphical representation of a control system is also provided.

According to another aspect, a method of modeling a delay in a time-based graphical representation of a control system having a pair of feedback loops in a graphical discrete event execution environment is provided. The method comprises passing a first time-based signal into a first discrete event execution entity generator block, creating a first set of entities based on the first time-based signal, passing a second time-based signal into a second discrete event execution entity generator block, creating a second set of entities based on the first time-based signal, combining the first and second set of entities into a combined stream of entities, serving each entity in the combined stream of entities, dividing the stream into said first and second sets of entities, converting the first set of entities to a third time-based signal and converting the second set of entities to a fourth time-based signal. Each entity is capable of holding at least one value of arbitrary data type. A medium for use in a graphical discrete event execution environment on an electronic device, the medium holding instructions executable using the electronic device for performing the method for modeling a delay in a time-based graphical representation of a control system is also provided.

BRIEF DESCRIPTION OF THE FIGURES

The illustrative embodiment of the present invention will be described below relative to the following drawings:

FIG. 8 is an illustrative embodiment of a Discrete Event System model environment;

FIG. 9 is an illustrative representation of the Event calendar for use with the present invention;

FIG. 10 is an illustrative embodiment of the event calendar and system model of the present invention;

FIG. 11 is an illustrative embodiment of a Discrete Event System model environment;

FIG. 12 is an illustrative embodiment of the event calendar of the present invention;

FIG. 13 is an illustrative embodiment of a Discrete Event System model environment;

FIG. 19 is an illustrative embodiment of the event calendar of the present invention;

FIG. 20A is an illustrative embodiment of the event calendar of the present invention;

FIG. 20B is an illustrative embodiment of the event calendar containing priority data for use with the present invention;

DETAILED DESCRIPTION

Therefore it is desired to provide a modeling environment that can model the occurrence of events independent of continuous model time. A discrete event system (DES) modeling environment is one wherein the system's state transitions depend on asynchronous discrete incidents called events. Such a model execution differs greatly from a time based model environment, such as Simulink®, wherein the execution of the model is time driven.

Figure 1:
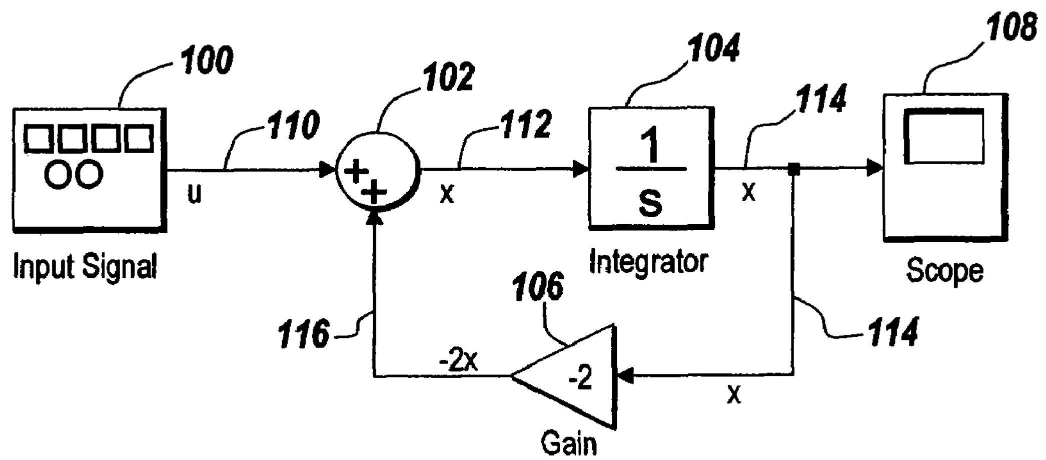
FIG. 1 is an illustrative embodiment of a Simulink® model for use with the present invention.
Figure 2:
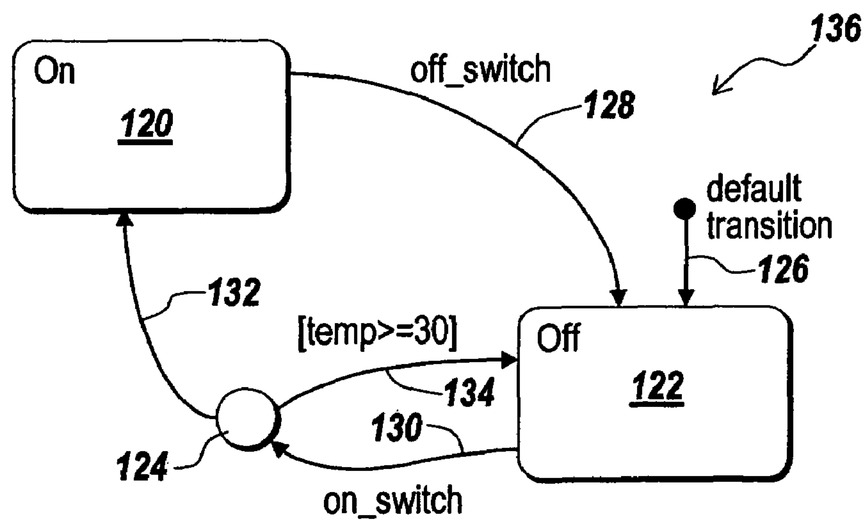
FIG. 2 is an illustrative embodiment of a Stateflow® model for use with the present invention.
Figure 3:
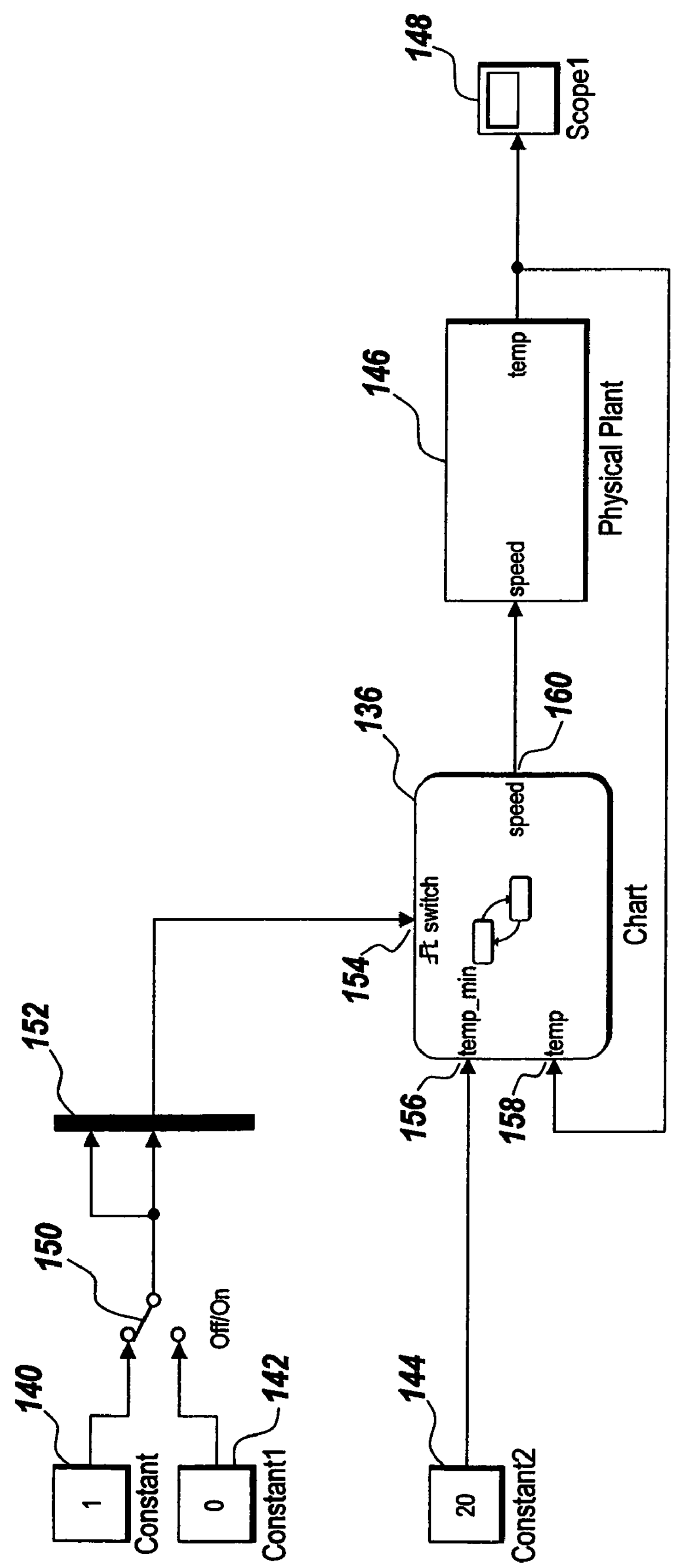
FIG. 3 is a hybrid external environment for use with the present invention.
Figure 4:
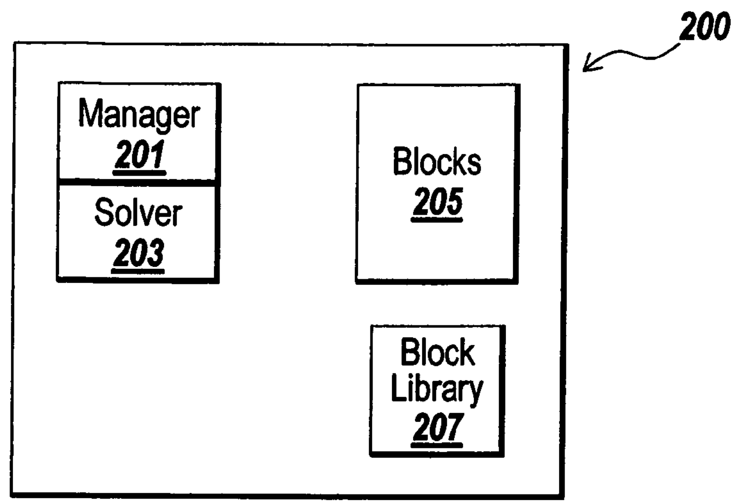
FIG. 4 is an illustrative example of a Discrete Event System model environment for use with the present invention.

In reference to FIG. 4, a DES model environment 200 is provided. The DES model environment 200 includes an event modeling manager 201. The manager 201 coordinates the operation of the DES model environment to process model executions. The manager 201 includes a solver 203, which processes the DES model configured in the DES model environment 200. The manager 201 provides for the implementation of the DES model environment 200 by supporting the creation of DES blocks 205 that represent various aspects of the DES model. The blocks 205 can represent different portions of the model as later described herein. Example blocks include an entity generator, a queue, a server, and a terminator, in addition to other blocks having specific tasks and implementations. A block library 207 can be provided that is customized for operation within the DES environment. Furthermore, the block library in the present DES modeler is not industry specific, thereby providing for numerous user-defined applications.

A primary data component within the DES model is referred to as an entity. Entities are abstract representations of areas of interest within the DES model and may vary depending upon that which is being modeled by the DES system. Entities are the items that pass from block to block in the DES modeling environment. For example, when modeling a digital network, an entity may represent a data packet. In another example, when modeling a manufacturing plant, entities may take the form of individual items on the assembly line. Each DES model has at least one entity within the model.

The blocks 205 are interconnected using block connectors that pass entities and other information between blocks. The information can include information from other models or data sources or references that have some contribution to the creation or operation of the entities as they pass through the DES model. The blocks can also have block connectors that pass information out to other models or data sources outside of the DES model.

In operation, the DES model environment 200 makes use of the various blocks to organize and manipulate entities through the DES model. For example, the manager 201 manages the configuration of multiple blocks 205 to form the DES model. Blocks 205 can be placed in the model for entity generation, subsequent entity manipulation, and eventually entity termination. The basic operation of the DES model involves passing the entities through the blocks according to instructions governed by the manager 201 and solver 203. The manager 201 can be represented by an event calendar, wherein the event calendar serves to drive the DES model forward by executing the next scheduled event in the event calendar. The solver 203 in the present invention is a DES specific mechanism which allows for the execution of events in the DES event calendar in light of operations that can occur in the external environment. The solver 203 of the present invention, therefore, is in communication with the external environment and can notify the external environment of events within the DES environment which can affect the semantics of the external environment.

Nominally, an entity contains a set of attributes associated with the entity. However, an entity can contain as few as zero attributes. An attribute can be a field wherein the attribute is named and the attribute type is defined. For example, a field can define the entity type as a Boolean, a real number, an integer number, an enumerated type, a string, a vector, a matrix, a frame, and the like, such that the entity is of arbitrary data type. An arbitrary data type represents an arbitrarily complex structure containing data that may include hierarchical composition. The contained data can be as general as a single bit of information and any sequence of such bits representing characters, numeric values, or any other syntactic and semantic datum. Furthermore, an entity can contain sub-entities. Sub entities can be utilized in numerous operations such as recursive nesting or combining hierarchies. The entity definition may be updatable during execution of the model.

The generation of entities can be automatic, or can be user-defined. User-defined entities allow users within a specific industry to define those attributes that are specific to their needs. The entity can then be incorporated into a DES model, thereby providing great user flexibility. Entities can further incorporate randomness into their behavior via probability distributions associated with blocks generating each entity. These probability distributions can be representative of the probability of an entity being generated based upon a set of defined variables. Probability distribution can be user defined or can be generated automatically, such that a probability of an event occurring drives entity generation within the model. Furthermore, the generation of a probability distribution may be accomplished utilizing other applications or environments, such as but not limited to the MATLAB® environment or the Simulink® environment.

It should further be noted that there can be a relationship between attributes and random numbers as well. When setting attributes of entities, the user can assign values based on input from separate environments, such as Simulink®, to attributes in passing entities. Such separate environments can allow the values to be drawn from a probability distribution. The separate environment thus allows the attributes to be assigned samples from random variables. These random values can be used to introduce randomness in a controlled way to other parts of the model when they move into those parts of the model.

Figure 5:
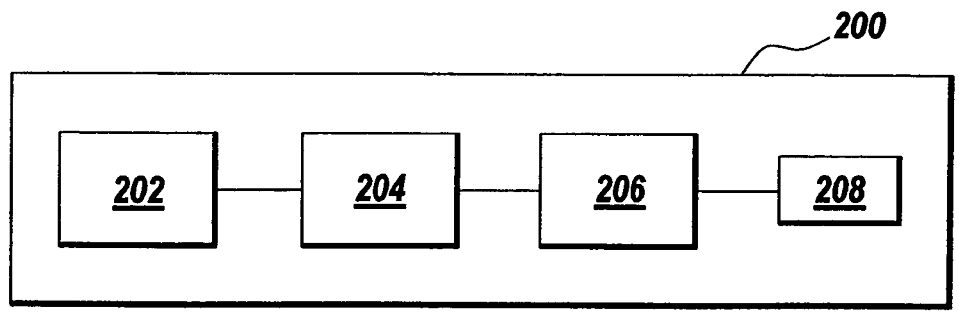
FIG. 5 is an illustrative embodiment of a Discrete Event System model environment.

FIG. 5 depicts a sample DES model environment 200. The present DES model environment includes sources 202 and sinks 208 as depicted in FIG. 5. Sources 202 correspond to those blocks that allow data input into the model, while sinks 208 correspond to those blocks that remove entities from the model. A source 202 in a DES model can take numerous forms. A source 202 can be an entity generator that produces numerous entities at fixed time intervals. Another example of a source 202 is an external operating environment outside of the DES model. For clarity, this external operating environment is not shown on FIG. 5. However, as an example, Simulink® can be used as a source for the present DES modeler, wherein a Simulink signal can trigger the generation of an entity for use in the DES model based upon criteria set by a DES modeler user.

Sinks 208 in a DES model can have functions other than terminating entities, such as returning arbitrary values from entities. A DES sink 208 can display all of the attributes passed to it, or can display a defined set of variables. Sinks 208 for use in the DES modeler of the present invention can also take various forms. One example of a DES modeler sink 208 is a Terminator Block. The Terminator Block can be defined to accept all entities delivered to it, or in the alternative can block all or some entities delivered to it according to selected conditions. Another example of a possible form of sink 208 in the present DES modeler is a Scope Block. The Scope Block can accept an entity and plots data from the entity in a graphical manner. This graphical depiction can allow a user to closely monitor the status of the DES model as well as view numerous trends within the model graphically. A Display Block can also display selected attributes of an entity. Furthermore, a sink 208 in the present invention can be a block that allows the export of a signal from the DES model to an external environment. For example the DES modeler of the present invention can include a block that receives an entity and outputs a Simulink® signal that may be used in a Simulink® environment.

In the present invention, entities generally pass from sources 202 to sinks 208. Entities can, however, traverse numerous intermediate blocks 204, 206 on the pathway from source 202 to sink 208. These intermediate blocks 204, 206 can be represented by numerous specialized DES blocks within the block library of the present DES modeler.

These intermediate blocks can have the same functionality as described above for the sinks. For example, the intermediate blocks can display all of the attributes passed to them, or can display a defined set of variables. The intermediate blocks can have conditions to define which entities can pass through them. Scope Blocks can serve as intermediate blocks that accept an entity and plot data from the entity in a graphical manner. Display Blocks can also display selected attributes of an entity. Furthermore, the intermediate blocks can include blocks that export a signal from the DES model to an external environment, or import a signal or other input information from an external environment.

Figure 6:
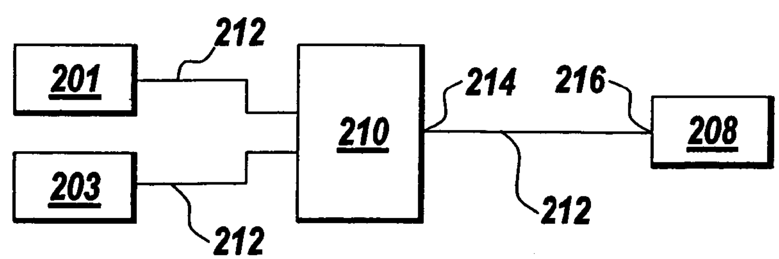
FIG. 6 is an illustrative embodiment of a Discrete Event System model environment.

FIG. 6 depicts an example of an intermediate block utilized in accordance with one embodiment of the present invention. A Routing Block 210 may be placed between two source blocks 201, 203 such that only a subset of entities is passed to a sink block 208. The subset is determined by the logic of the Routing Block 210 and the data that it uses to determine the path from which the entity is allowed to arrive. Additional intermediate blocks that can be used in accordance with the present invention include, but are not limited to Logical Gates, Queuing Blocks, Storage Blocks, Routing Blocks, Execution Control Blocks, Server Blocks, Resource Allocation Blocks, Timer Blocks, Timeout Blocks, and Delay Blocks. Additionally, the DES environment allows for users to customize and define their own blocks specific to the problem they are modeling and the model they have developed.

The path that an entity takes through the DES modeler environment, as depicted in FIG. 6, is an entity path 212. The entity path 212 is any connection from an entity output port 214 to an entity input port 216 on a block within the DES modeler. For illustrative purposes, these entity paths are represented by a line connecting the entity input 214 and output ports 216 of blocks within the DES model environment. The entity path 212 in the DES model environment is active only when an entity is passing through the entity path 212. At times when there is no entity passing through the entity path 212 in the execution, the entity path has no value associated with it.

Further, there may be associated with each block in a DES environment a state, wherein the state is a persistent data set corresponding to the block. The state variable of a block contains a set of attributes associated with the block (i.e. a Boolean operation, string, parsable string array) and may contain a sub state variable for nesting and combining hierarchies.

Within the DES model of the present invention there can be numerous events. Events are instantaneous occurrences that change a state variable, an output, a future event or any combination thereof. Events are generated at any point at which a block within the DES model acts on an entity. Events can take numerous forms, but by example can include the creation of a new data packet in a network, the exit of a package from a loading dock or the placement of an item on a conveyor belt in a manufacturing plant. Each event within a DES model contains four specific characteristics associated with the event. Firstly, each event specifies an entity, namely a set of data associated with the event. Additionally, each event has time data associated with it, defining when the event is scheduled to occur. Events in a DES model can also have a priority associated with their execution, thereby defining the urgency of the event relative to other events that may occur at the same time. Finally, each event has a destination object associated with it, which serves to identify where the event is to take place. The destination object is typically a DES model block but can also be an entity.

Figure 7:
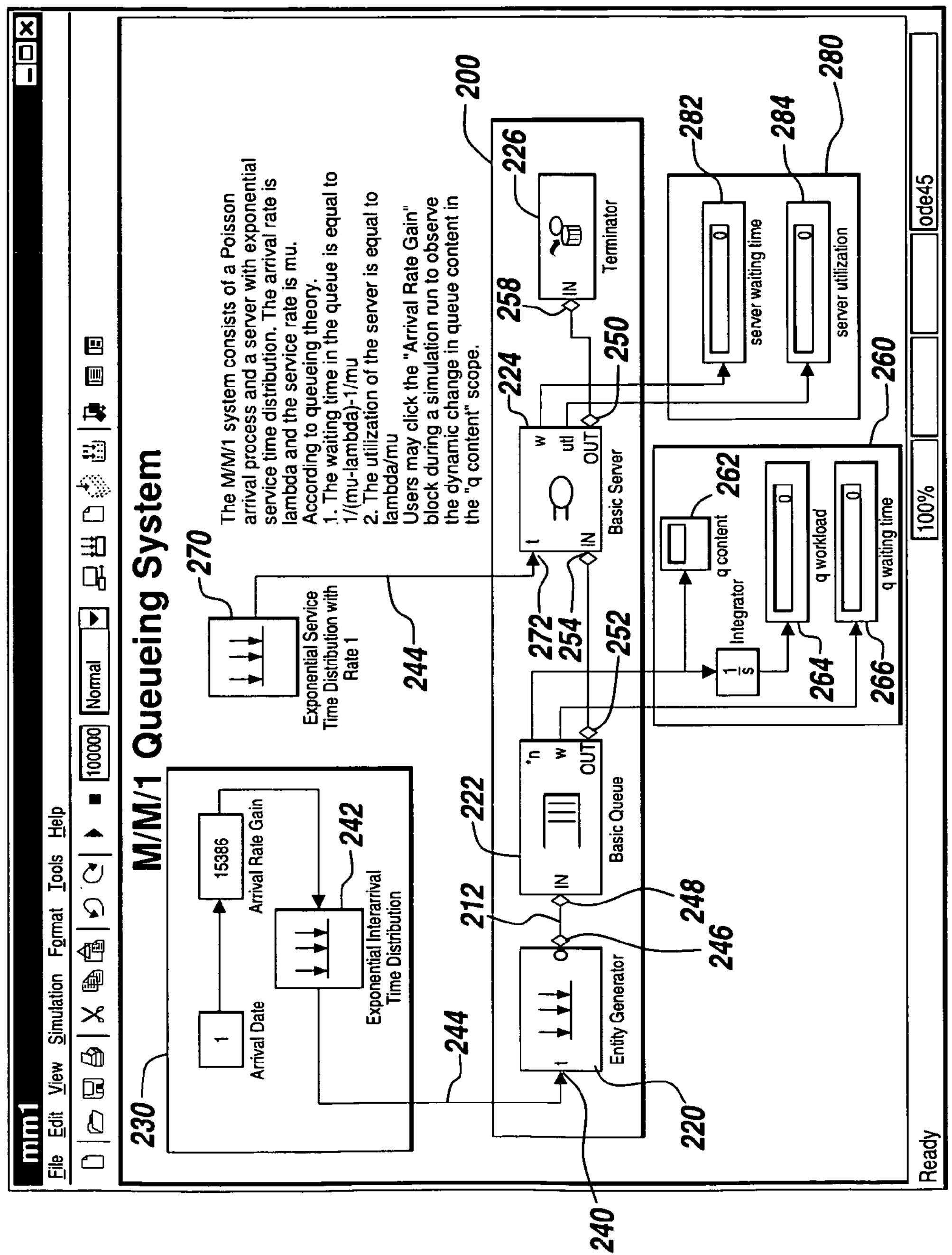
FIG. 7 is an illustrative embodiment of a Discrete Event System model environment in communication with an external environment.

In FIG. 7, a DES environment 200 is denoted. The DES model is capable of communicating with external environments of various forms 230, 260, 270, 280 including such examples application as Simulink® and Stateflow®. In one embodiment, the DES model can receive data from these environments 230 and 270 as well as output data to these external environments 260, 280 in accordance with the needs of the user generating the model. Communication with the external environments 230, 270, 260, 280, however, is not necessary, as execution models may be created solely within DES environment that have no interface with environments beyond the DES environment 200.

An entity generator within the DES environment 220 can interface with an external environment 230, such as Simulink®, at port "t" 240 on the entity generator 220. The entity generator block 220 is an example of a source block within DES. The signal transmitted on signal path 244 and received at port "t" 240 is used to control the rate of entity generation by the entity generator 220. Associated with the signal on signal path 244 is a probability distribution provided by the Exponential Interarrival Time Distribution (Simulink®) subsystem 242 within the external environment 230. In light of this probability distribution, a varying signal is presented to the entity generator 220 resulting in the generation of entities in accordance with the probability distribution of the Exponential Interarrival Time Distribution (Simulink®) subsystem 242. Entities generated by the entity generator 220 are passed from the output port of the entity generator 246 to the input port of the queue block 248 over the entity path 212.

The queue block 222 accepts entities and is capable of forwarding them to further associated blocks. In the present example, the entities generated by the entity generator 220 can be forwarded to the server block 224 by the queue block 222 in accordance with user defined values. For example, a user may instruct the queue to hold no more than 10 entities for forwarding. When the queue block 222 has reached capacity, the input port to the queue block 248 may be temporarily disabled thereby preventing the introduction of any more entities to the queue block 222. In such a scenario, the input port of the queue block 248 is defined as unavailable. When the number of entities within the queue block 222 has decreased below the 10 entity limit, the input port to the queue block 248 can be made available, allowing the delivery of additional entities from the entity generator 220 to the queue block 222. Entities within the queue block 222 can be queued based upon the time at which they were generated by the entity generator 220, or can be queued based upon numerous other arrangements. For example, a priority may be associated with various entities, and the queue block 222 may queue entities based upon their priority. Furthermore, as exhibited in FIG. 7, the queue block 222 may interface with an external environment 260 outside of the DES model 200. As illustrated, the queue block 222 has been associated with a scope 262, a first display 264 and a second display 266, thereby allowing a user to graphically view that which is occurring within the queue block 222.

The queue block 222 of the illustrative embodiment can pass entities from the output port of the queue block 252 to an input port 254 of the associated server block 224. The server block 224 can accept entities delivered through the entity path 212 connecting the queue block output 252 to the Server Block input port 254. The Server Block 224 can delay a received entity for a time before passing it to the next associated block, namely the Terminator Block 226. The delay associated with a server is known as a "service time". Service time may be user-defined, or may be based upon an internally or externally generated value. For example, the example embodiment utilizes a Simulink® signal with an associated probability distribution in the Exponential Service Time Distribution with Rate 1 block 270. This results in a variable service time for the server block 224. This variable service time is provided to the Server Block 224 at port 272 of the server block via a signal line 244. While the server block 224 is busy, i.e. during the service time, the server block 224 will make its input port 254 unavailable, thereby preventing the reception of any additional entities. Upon expiration of the service time, the input port to the server block 254 will be made available, thereby allowing the passage of entities once again. Simultaneously, once the service time is completed, the server can pass entities from an output port of the server block 250 to a further associated block. In the present example, this block is a terminator block 226, which is a sink within the DES environment. The terminator block 226 can be user-defined to accept all entities passed to it, or may have other functionality defined by a user. For example, the terminator block 226 may be defined such that it blocks all entities delivered to it, or may produce an error message upon the arriving of an entity. The server block 224 of the illustrated embodiment can further be associated with an external environment 280 external to the DES model. As evidence in the example, the server block 224 can deliver a signal to a first graphical interface 282 and a second graphical interface 284 so that a user can monitor the internal operations of the Server block 224.

In a DES model environment, the DES solver is driven by ordered events, therefore time becomes a secondary variable in the execution. The order of events within a DES model is continually updated in response to changes in the model. Utilizing such an event-driven model, only those points at which an event is scheduled to occur need to be modeled. Time between events, namely "empty time" need not be modeled, thereby resulting in improved efficiency and decreased processor demand.

Events within a DES model are scheduled and managed using an Event Calendar. Unlike a time-based modeling environment, size of the time interval between events is simply the period of time between events. Using the Event Calendar, the DES model can determine when to update the states of certain block in the model, and can also infer when to save time by not updating states. An example of the application of the Event Calendar is best seen by example.

FIG. 8 is an example DES model for use in describing the Event calendar. Assume that the blocks are configured so that the Entity Generator 300 block generates an entity at various times, namely t=0.9 seconds, 1.7 seconds, 3.8 seconds, 3.9 seconds, 6 seconds. Further assume that the queue block 302 has a capacity of 20. Additionally, assume that the server block 304 uses random service times that are uniformly distributed between 0.5 seconds and 2.5 seconds. When the execution first starts, the queue block 302 and server block 304 are empty. The entity generator block schedules a first event at t=0.9 s. An illustrative example of the event calendar 900 at time t=0.9 is illustrated in FIG. 9. One skilled in the art will recognize that the described parameters are merely illustrative of one example, and that the model can generate any suitable number of entities at any suitable time, the queue block can have any suitable capacity and the server block can have any suitable service time.

At t=0.9 seconds, the entity generator block 300 of FIG. 8 creates an entity and attempts to output the entity from the entity generator output 346. Because the queue block 302 is empty, the entity advances from the entity generator block output 346 to the queue block input 348 over the entity path 212 in the model. Since the queue block 302 has no entity within it, the queue block 302 attempts to output the entity to the next block in the model, namely the server block 304. Because the server block 304 is empty, the entity advances from the queue block 302 to the server block 304. At this moment, the server's entity input port 354 is temporarily unavailable to future entities.

Upon receiving the entity, the server block 304 schedules an event that indicates when the entity's service time is completed. For the purpose of illustration, duration of service of 1.3 seconds is assumed. In light of this, service will be completed at a time of t=2.2 seconds, the sum of the time that the entity enters the server, and the service time.

As set forth previously, a second entity generation event is scheduled at t=1.7 seconds. The event calendar and the associated DES model 903 at a time of t=1.7 seconds is depicted in FIG. 10. The updated Event Calendar 902 is shown, as well as a graphical representation of entity status within the DES model. In FIG. 10, the element marked "e1" 404 signifies the first entity and the dashed arrow 906 serves to indicate the advancement of the first entity 404 from the entity generator block 300 to the queue block 302 and finally to the server block 304.

As evidenced in the Event Calendar at time t=1.7 seconds 902 of FIG. 10, a second entity is to be generated at a time of t=1.7 seconds.

FIG. 11 is an illustrative embodiment of the present invention at a time of t=1.7 seconds 904. At a time of t=1.7 seconds the entity generator block 300 will create an entity "e2" 504 and will attempt to output it. The queue block 302 is empty at this point in time, so the second entity 504 advances from the entity generator 300 to the queue 302 as illustrated in FIG. 11. The advance of the second entity 504 is depicted by the dashed arrow 506.

As depicted in FIG. 11, the newly generated entity "e2" 504 is the only one in the queue block 302. The queue block 302 will therefore attempt to output the second entity 504 to the server block 304. As entity e1 404 remains in the server block 304, the server block's input port 354 is unavailable to receive the second entity 504. The second entity 504 will therefore remain in the queue block 302 until the server becomes available.

FIG. 12 is an illustrative example of the event calendar at a time of t=2.2 seconds 905. Based upon the original assumptions, the entity generator block will schedule the generation of a third entity (e3) at a time of t=3.8 seconds.

FIG. 13 is an illustrative embodiment of the present invention at a time of t=2.2 seconds 906. At t=2.2 seconds, the server block 304 finishes serving the first entity 404 (i.e. service time is completed) and attempts to output the first entity 404 to the associated terminator block 306. The terminator block 306 is simply a sink that by definition accepts and absorbs all entities. In light of this, the first entity (e1) 404 advances from the server block 304 output port 356 to the terminator block 306 input port 358. As the first entity (e1) 404 advances, the server block's 304 entity input port 354 becomes available once again, allowing the queue block 302 to pass the second entity (e2) 504 to the server block 304 via the server block input port 354 via an entity path 212. Upon passing the second entity 504 to the server block 304, the queue block 302 is now empty and the server block 304 becomes busy again. As the server block 304 is busy, the server block's entity input port 354 becomes temporarily unavailable once again.

Figures 14, 15, 16:
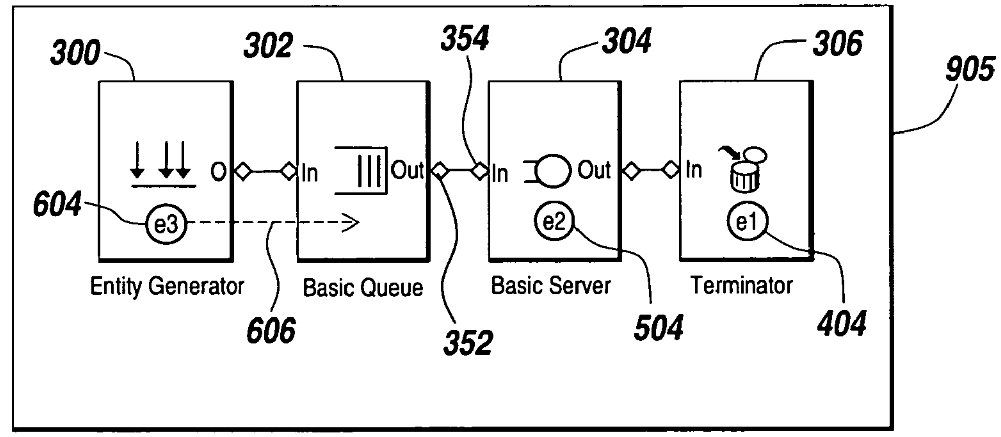
FIG. 14 is an illustrative embodiment of the event calendar of the present invention.
FIG. 15 is an illustrative embodiment of a Discrete Event System model environment.
FIG. 16 is an illustrative embodiment of the event calendar of the present invention.

FIG. 14 is a depiction of the Event Calendar at a time of t=3.8 seconds 904. The event calendar at time t=3.8 seconds has been generated using the assumption that a service time of t=2.0 seconds has been established for the second entity.

FIG. 15 is a graphical depiction of the DES model at a time of t=3.8 seconds 905. At t=3.8 seconds, a third entity 604 will be generated by the entity generator block 300. The queue block 302 remains empty, so the third entity 604 advances from the entity generator 300 to the queue block 302. The advancement of the third entity 604 from the entity generator 300 to the queue block 302 is illustrated by the dashed line 606.

Because the third entity 604 is the only one in the queue block 302, the queue block 302 will attempt to output the entity to the server block 304. As set forth above, the server block's input port 354 remains unavailable due to the presence of the second entity 504 in the server block 304, so the third entity 604 will remain in the queue block 302. The queue block's 302 entity output port 352 is said to be blocked because an entity has tried and failed to depart via this port.

FIG. 16 graphically represents the event calendar at a time of t=3.9 seconds 906.

Figure 17:
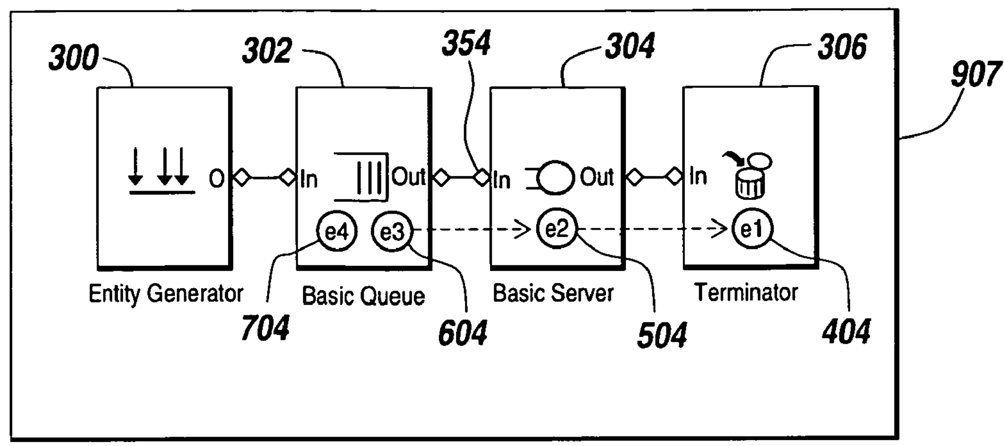
FIG. 17 is an illustrative embodiment of a Discrete Event System model environment.

FIG. 17 is a graphical depiction of the present invention at a time of t=3.9 seconds 907. At t=3.9 seconds, the entity generator 300 schedules the generation of a fourth entity 704. The entity generator 300 will attempt to output the fourth entity 704 to the queue block 302. Since the queue block 302 is not full, the fourth entity 704 will advance from the entity generator block 300 to the queue block 302. The server block's entity input port 354 remains unavailable, therefore the queue block 302 cannot output the fourth entity 704 to the server block 304. The queue length within the Queue Block 302 is two, as depicted in FIG. 17.

Figure 18:
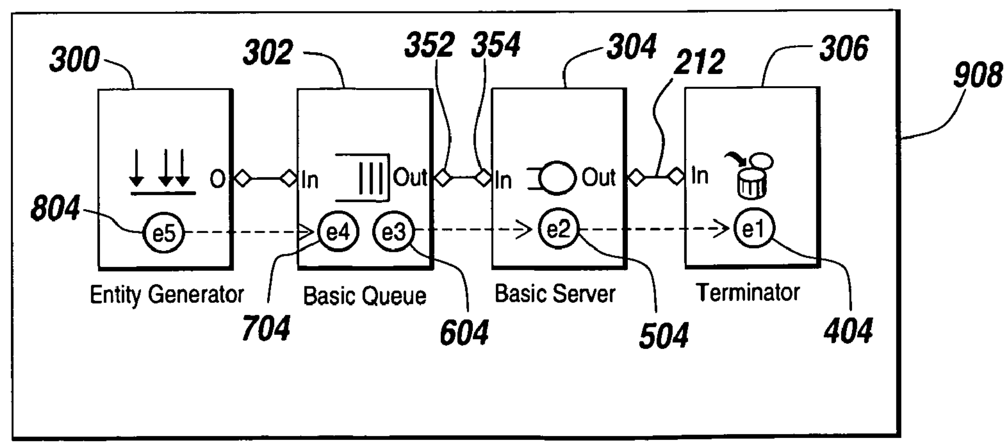
FIG. 18 is an illustrative embodiment of the event calendar and system model of the present invention.

FIG. 18 is a graphical depiction of the DES model 908 and event calendar 909 at a time of t=4.2 seconds. At t=6.0 seconds, a fifth entity 804 is generated by the entity generator 300. At time t=4.2 the server block 304 finishes serving the second entity 504 and attempts to output the second entity 504 to the terminator block 306. The terminator block 306 accepts the second entity 504 and the second entity 504 advances from the server block 304 to the terminator block 306 via a entity path 212. Additionally, the server block's entity input port 354 becomes available, so the queue block's entity output port 352 becomes unblocked. The queue block 302 is now able to output the third entity 604 to the server block 304. The queue length within the queue block 302 has decreased to only one entity, namely the fourth entity 704, and the server block 304 once again becomes busy. The server block's entity input port 354 again becomes temporarily unavailable. The server block 304 will schedule an event on the event calendar that indicates when the entity's service time is completed on the event calendar. For illustrative purposes, 0.7 seconds will be used. The event calendar at a time of t=4.9 seconds 909 is presented in FIG. 19.

The queue block 302 will attempt to output the fourth entity 704, but the server block's entity input port 354 is unavailable. In light of this, the fourth entity 704 remains in the queue block 302. At the same instant, the queue block's entity output port 352 becomes blocked, prohibiting further attempt to pass the fourth entity 704 to the server block 304 while the server block's input port 354 remains blocked.

Remaining entities within the illustrated model will pass through the model in accordance with the above steps as driven by the event calendar. Additional entities may be placed on the calendar by the entity generator block 300, or no additional entities may be generated and the execution will be complete upon the passage of the fifth entity 804 to the terminator block.

The defined times on the event calendar are inherently important within the DES modeling systems, as events on the event calendar serve as indicators of times at which the systems state is changing. In contrast, times between events on the event calendar are not important to modeling the system, in that at these times the system state remains unchanged. In light of this, the DES modeler skips the static periods and focus on the event times of the event calendar. Such an arrangement offers increased efficiency as compared to a fixed sampling interval.

Additionally, at defined times within the event calendar, multiple states can change instantaneously. For example, at time t=2.2, the server block 304 becomes idle and then busy again. Simultaneously, the queue length also changes because the queue block 302 outputs a second entity (e2) 504 to the server block 304.

The illustrative event calendar serves as a convenient example of event processing at discrete time intervals within the model. Inherent in advanced modeling of a system, however, is an occurrence of two or more events that are scheduled to occur at the same time instant. Such events are defined as "simultaneous" events and are depicted on a sample event calendar in FIG. 20A. The sequential processing of these simultaneous events may be irrelevant or relevant to the execution results, therefore the DES modeler contains numerous methods for determining the proper processing sequence. One such method is the assignment of priority levels to the events.

In FIG. 20B, priority values 830, 832 are assigned to the simultaneous events 820, 822 within the event calendar. The relative priorities among the simultaneous events therefore determine their processing sequence within the event calendar. Using a priority value associated with simultaneous events allows a user to decide how various events are related to each other. However, this approach might be inappropriate if a deterministic approach produces a bias that inaccurately reflects the phenomena that a user is modeling. In light of such concerns, a random sequence may be utilized. The random sequence for executing simultaneous events offers the advantage of eliminating bias in the execution, but results in the non-repeatability of the execution should a user run the execution more than once, assuming random number seeds are not utilized.

The DES model of the present invention allows for the transfer of information to various block within the DES model environment, as well as to environments outside of the DES model. For example, as indicated in FIG. 7, the use of a terminator block as a sink may allow for acceptance of all entities within the model. In place of or in conjunction with the terminator block, a scope block may be utilized to accept an entity and plot data from an attribute of the entity. Data plotted may include a plot of information related to entities experiencing a discrete event or a discrete state. Utilizing a scope block a user can visually verify the operation and performance of a DES model. Additionally, a display block may be associated with the DES model such that the value of an attribute of an entity is graphically displayed. The DES model of the present invention further includes blocks that allow the export of entity attribute values to regions outside of the DES model environment. For example, individual entity priority data may be exported to an external modeling environment such as Simulink®. Control of export of data from this block can take place within the DES model environment, can be controlled by an external environment, or can be a combination of both. In light of this, when modeling complex systems, the DES model of the present invention can be incorporated into other modeling, execution, and display applications. In the alternative, the DES model of the present invention can operate in a stand alone configuration, wherein a system to be modeled is modeled solely within the DES model environment.

In one embodiment of the invention, an event-driven discrete event execution environment can be used to model a control system using one or more discrete event-driven components able to support at least one entity passing therethrough holding a value of arbitrary data type. As described above, the entity definition may be updatable during execution of the model of the control system. The event-driven components can be used to model certain portions of a control system that cannot be accurately and efficiently modeled using a time-based model. The model can contain cyclic graphs, in one embodiment of the invention.

An embodiment of the present invention provides for discrete event execution blocks to interface with components of a graphical representation of a system such as time-based blocks in a model of a feedback loop. For example, a user can model causality, model partitioning and execution order for the DES solver to allow a graphical discrete event execution model to flexibly model immediate and delayed feedback for a multitude of cases. In another example, a feedback loop including discrete event components in a model that may comprise discrete-event components or a hybrid of continuous-time components and discrete-event components may be used. The feedback loop can be implemented to control a parameter, such as the number of events generated by an entity generator in a discrete-event model or a time-driven controlled object, such as a plant.

Data can be translated between a discrete-event based modeling domain and a time-driven modeling domain to facilitate modeling of a control system having time-driven components and event-driven components. For example, time-driven components and event-driven components can both be implemented in a graphical model to model a system that exhibits both time-driven and event-driven behavior. To interface the different components, time-based signals from time-driven blocks are translated to entities and passed to event-driven DES blocks and/or entities from event-driven blocks are translated to time-based signals and passed to time-driven blocks in a model.

Figure 21:
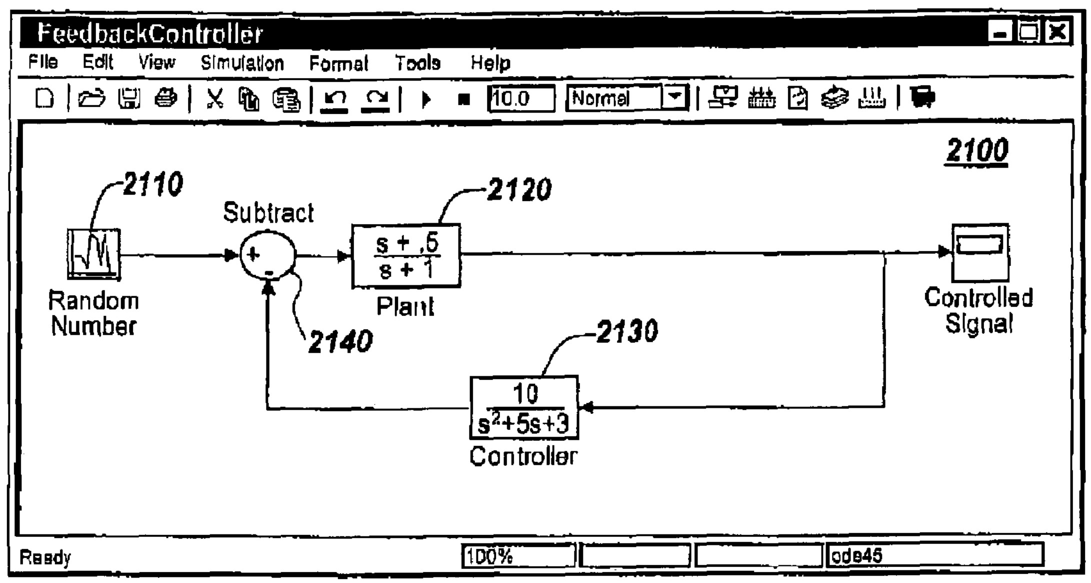
FIG. 21 illustrates a block diagram of typical control system.

In an illustrative embodiment, a discrete-event based model can be used to model a delay in a time-based feedback loop that is induced by multitasking or network latency. DES components may also be used to model a delay in an operating system. In a time-based simulation environment, such as Simulink®, typical elementary control systems are modeled using an analog signal control system with a continuous time (analog signal) controller. For example, FIG. 21 shows a graphical representation, illustrated as a block diagram, of typical control system 2100 in a time-based modeling system in the current state of the art. The control system shown in FIG. 21 consists of an input source block 2110 for providing a source signal, which, in the illustrated embodiment, comprises a random number, a controlled object block 2120, representing a component, such as a plant, to be controlled, a controller block 2130 and a comparator block 2140. The comparator block 2140 performs a subtraction operation to compare a signal from the controller block 2130 with the signal from the input source block 2110. The controller block 2130 receives the output of the controlled object 2120 and determines a suitable control signal to pass to the comparator 2140. The comparator block 2140 subtracts the control signal from the source signal to produce an input signal for the controlled object block 2120. The controller block 2130 adjusts the control signal based on the output of the controlled object block to provide an input signal that will result in a desirable output signal from the controlled object. This is typically done by the controller having a response characteristics that, when combined with the controlled object's response characteristics, creates a stable system with the desired behavior. In the example of FIG. 21, the signals produced and passed between the blocks are continuous-time analog signals.

Figure 22:
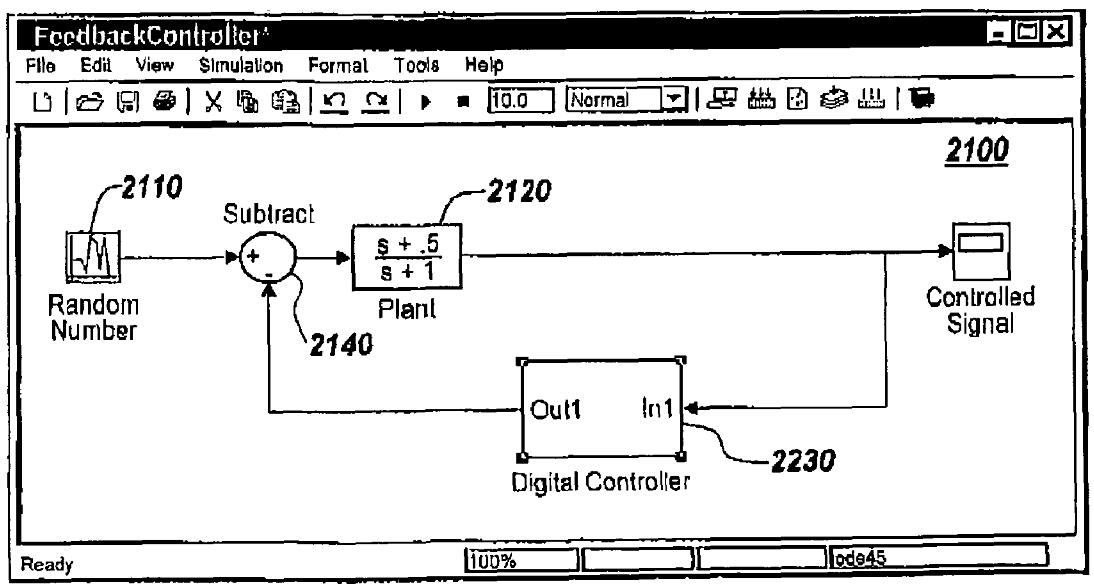
FIG. 22 illustrates a block diagram of control system including a digital controller.
Figure 23:
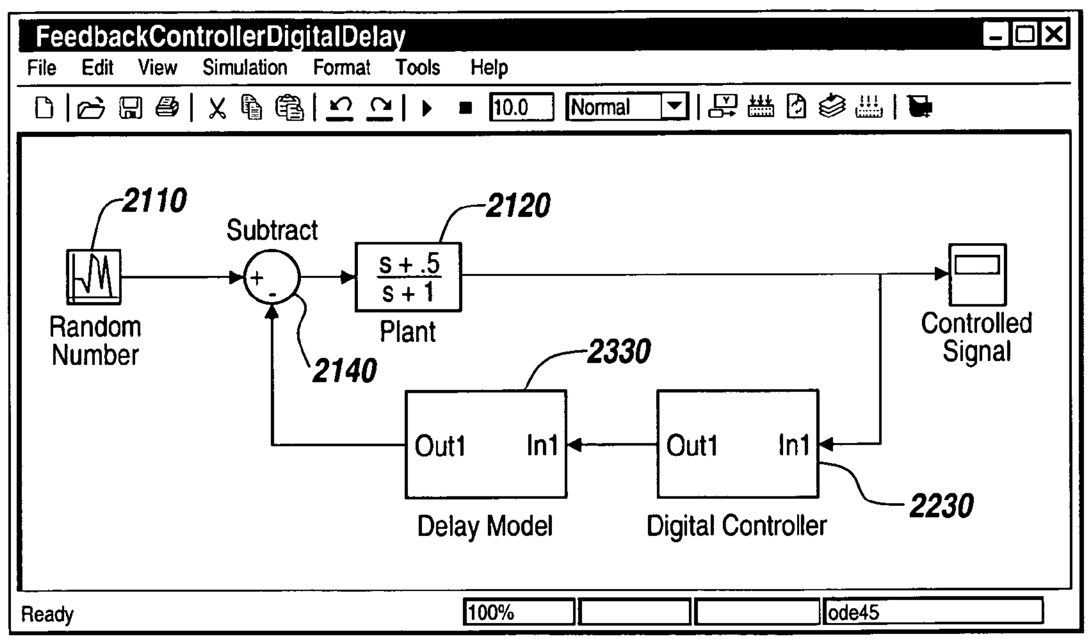
FIG. 23 illustrates a block diagram of control system including a digital controller and a delay block for modeling delay caused by the digital controller.

As shown in FIG. 22, a digital controller, represented by a digital controller block 2230, can be used in the control system represented by the model of FIG. 21. A digital controller enables programmability, and nonlinear control, including mode switching. When the digital controller is dedicated to controlling a single loop, as shown in FIG. 22, the latency characteristics of the controller can be well quantified and controlled to allow for adjusted parameters so as to not adversely affect the performance of the control loop. Control theory and the practice of implementing control systems has advanced to the point of being able to design the correct controller for such situations.—For example, as shown in FIG. 23, a continuous time-driven model including a digital controller block 2130 can include a delay block 2330 to model the delay incurred by using a digital controller.

Figure 24:
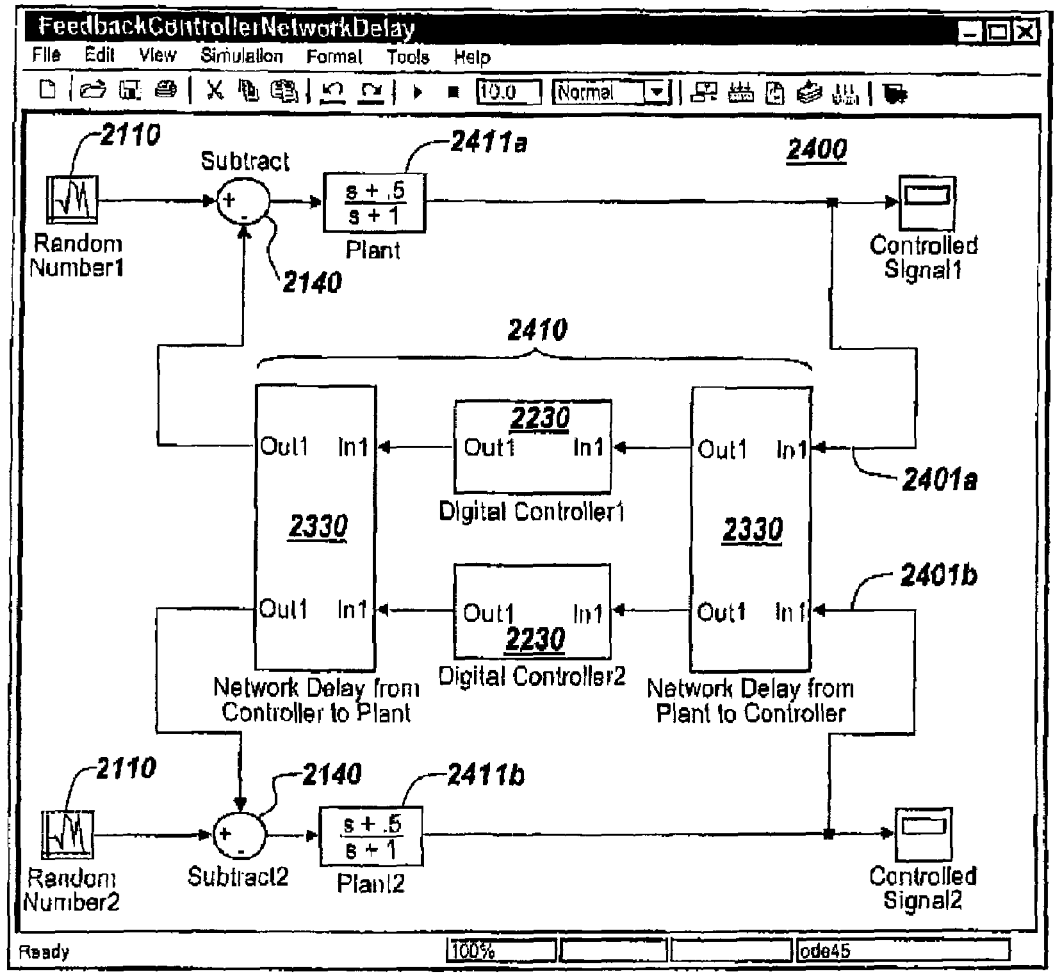
FIG. 24 illustrates a block diagram of a control system including a digital controller controlling a plurality of feedback loops.

As shown in FIG. 24, a digital controller, such as the digital controller 2230 implemented in the control system of FIG. 22, can be used to control a number of feedback loops in a control system modeled using a block diagram 2400. Alternatively, a digital controller may be implemented in a digital network that operates on digital signals rather than analog signals, such as an Ethernet network, a controller area network or a computer bus. In such systems, detrimental effects can occur, which can be modeled using components of a discrete-event execution modeling environment. For example, in one embodiment of the invention, a graphical model including DES blocks operating on entities holding a value of arbitrary data type can be used to model certain effects in a control system of delays caused by multitasking when a network is shared by a plurality of digital controller loops. A graphical model implementing DES blocks operating on entities, each entity holding at least one value of arbitrary data type, can also be used to model network latency, for example, caused by remote access via network.

Figure 25:
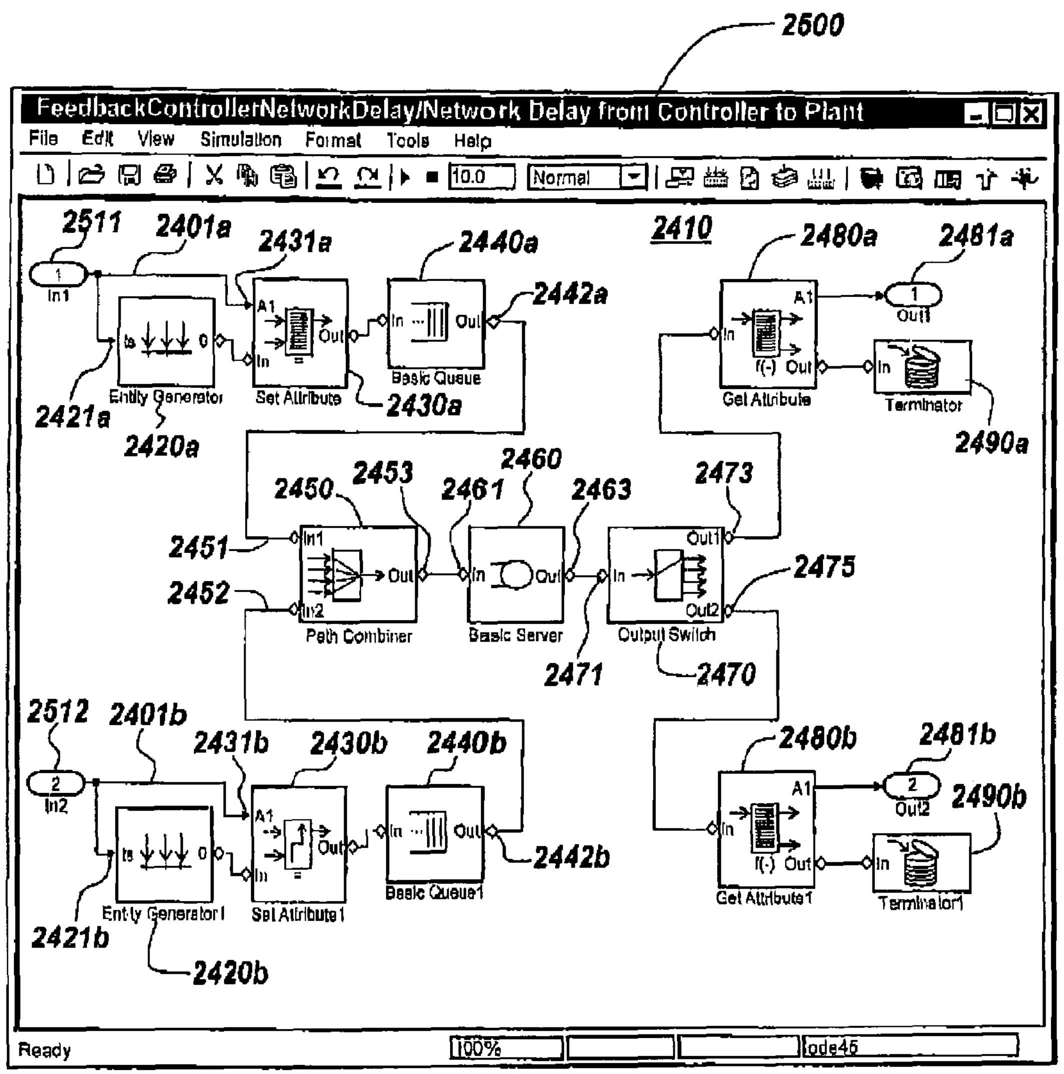
FIG. 25 shows a model implementing DES components suitable for modeling the network delay induced in the shared portion of the model of FIG. 24 according to an illustrative embodiment of the invention.

To model the delays caused by sharing the network, for example in the pair of control loops modeled in the block diagram of FIG. 24, a subsystem implementing DES components may be used. FIG. 25 shows a model implementing DES components suitable for modeling the network delay induced in the shared portion 2410 of the model of FIG. 24 according to an illustrative embodiment of the invention. The event-driven model of FIG. 25 is suitable for approximating the detrimental effect of having two controlled objects controlled by two controllers across a pair of networks, a situation modeled in FIG. 24. The model 2400 of FIG. 24 is configured so that communications from both plants to both controllers shares a first network while the communications from both controllers to both plants shares a second network.

In the subsystem illustrated in FIG. 25, input ports 2511, 2512 receive time-based signals 2401*a*, 2401*b* from the controlled objects 2411*a*, 2411*b*, respectively, of the model 2400 of FIG. 24. The time-based signals 2401*a*, 2401*b* pass to entity generator blocks 2420*a*, 2420*b*, which receive the time-based signals via input ports 2421*a*, 2421*b*. Based on the time-based signals, the entity generator blocks 2420 create entities representing a packet from the time-based input signal whenever the value is updated by the time-based system 2400. The input signals 2401*a*, 2401*b* branch off and are also passed to set attributes blocks 2430*a*, 2430*b* via attribute input ports 2431*a*, 2431*b*. Each set attributes block 2430*a*, 2430*b* applies attributes to the entities generated by the connected entity generator block and passed to the set attribute block via a connection line. The attributes are created with payloads containing the values from the input signals from the time-based part of the model 2400. The entity can hold a value of arbitrary data type, as described above. The entities then pass from the set attributes blocks 2430*a*, 2430*b* to storage facility blocks, illustrated as basic queue blocks 2440*a*, 2440*b*, which queue up the received entities within the block. The storage facility block may be any suitable block for storing entities. A path combiner block 2450 having two entity input ports 2451, 2452 each connected to the output port 2442*a*, 2442*b* of a basic queue block 2440*a*, 2440*b*, respectively, receives and combines the streams of entities from the basic queue blocks. The path combiner block 2450 passes the combined stream of entities out of an entity output port 2453 to an input port 2461 of a basic server block 2460. The server block 2460 delays the entities by a selected amount of time representing the latency of the network modeled in the model 2400. Since the server can only serve one entity at a time, the server block 2460 effectively models the characteristic of multiple access networks in as much as these networks typically allow only one packet at a time. This means that some packets will need to wait while other packets are being served. After an entity is served by the server, the entity is routed to the correct address by an output switch block 2470. The output switch block 2470 has a single input port 2471 connected to the output port 2463 of the server block 2460 and a plurality of output ports 2473, 2475 for passing an entity along a selected path. A get attribute block 2480*a*, 2480*b* is connected to each output port 2473, 2475, respectively, of the output switch 2470 for receiving entities passed by the connected port. Each get attribute block extracts the payload value from the received entity, and uses this value to update the corresponding time-based signal, which is then output from the subsystem by the associated out port 2481*a*, 2481*b*. Terminator blocks 2490*a*, 2490*b* remove each entity from the model after the get attributes blocks uses the entity to update the time-based signal.

The model 2500 of the shared network portion thus employs discrete event-driven execution components to model the contention for networks and the corresponding detrimental behavior of the plants when controlled using a technique that allows for delay and variations on the delay (jitter) in the control signal. One skilled in the art will recognize that the embodiment shown in FIG. 25 is merely illustrative of a suitable DES model suitable for modeling a portion of a time-based graphical model and that the invention is not limited to this exemplary embodiment. Any suitable combination of DES components may be used within a time-based system to model any suitable event-driven behavior, not limited to delay in a control signal.

The modeling technique shown in FIG. 25 can be enhanced to include variations in service time due to more attributes being set in the entities representing packets. These attributes can represent data rate, length of packet or any suitable parameter. Furthermore, the model topology can be enhanced such that the communications in both directions for both loops can share one network.

In addition, many networks have their own protocols for modeling access contention resolution. Additional blocks may be included in the DES model to allow the contention to be modeled in addition to the resource allocation.—The described modeling technique can also be extended to other applications areas, including, but not limited to manufacturing, logistics, computer performance modeling and others known in the art.

In another embodiment of the invention, a feedback loop in a discrete event model can be used to control a parameter or operation of a component of a DES model, such as the number of entities generated by an entity generator block or the selection of an active output port used by an output switch block. For example, the entity generator block can increase the time period between which entities are generated when the queue length in the queue block is longer, generating fewer entities and allowing the queue line to reduce in size before increasing the entity generation rate. Such a principle may be used to model behavior exhibited by people joining a waiting line, in which fewer people tend to join a line when the line is longer. The implementation of a discrete-time and/or continuous-time feedback loops within a discrete event model facilitates immediate and/or delayed control of DES components.

Figure 26:
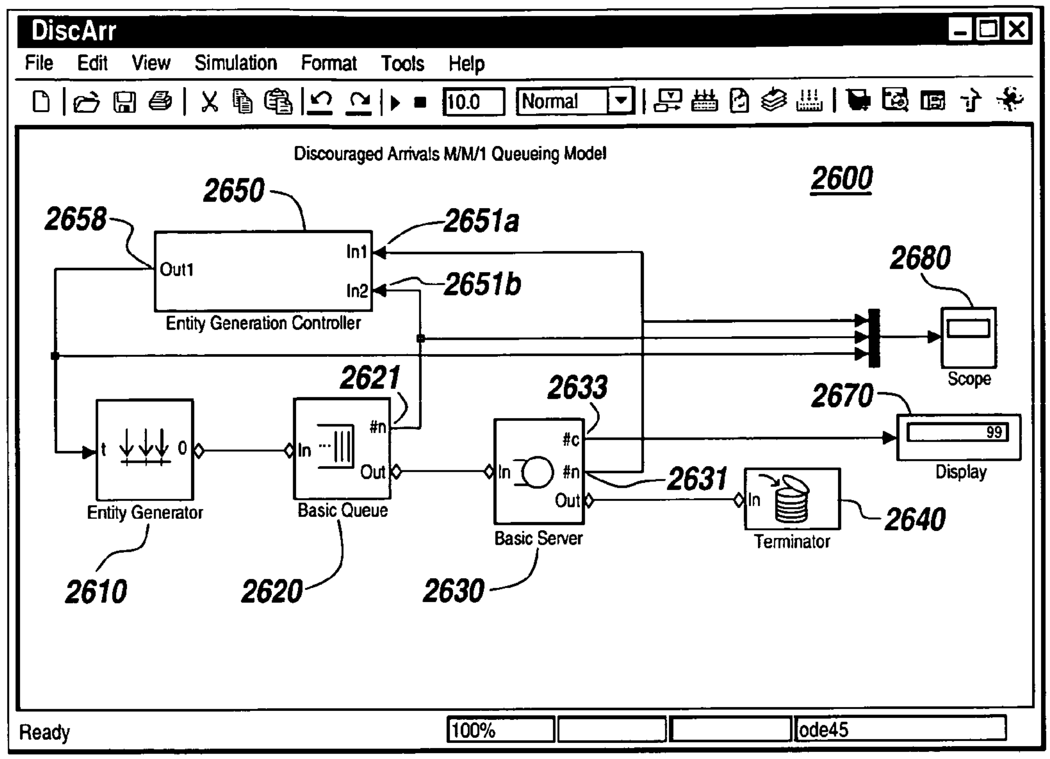
FIG. 26 illustrates an example of a graphical model implementing a feedback loop that controls operation of a DES component according to an illustrative embodiment of the invention.

An example of a graphical model implementing a feedback loop that controls operation of a DES component is demonstrated in FIG. 26. The model 2600 includes an entity generator block 2610 for generating entities, a storage block, illustrated as a basic queue block 2620 for queuing entities generated by the entity generator block, a basic server block 2630 for servicing the entities and a terminator block 2640 for removing a served entity from the model. The basic queue block 2620 and server block 2630 each include a signal output port 2621, 2631, respectively, producing a signal indicative of the number of entities in the queue or server, respectively. An entity generation controller block 2650 is used to control the inter arrival time of the entity generator based on the number of entities in the basic server and the basic queue blocks or other storage blocks. In the illustrative embodiment, the controller 2650 is a time-driven component that operates on time-based signals. As shown, a first input to the entity generation controller block 2650 is a signal from the basic server block indicative of the number of entities in the server. A second input to the entity generation controller is a signal from the basic queue block indicative of the number of entities in the queue block. The controller produces an output signal based on the information in the two input signals and passes the output signal to a signal input port 't' of the entity generator block 2610. The output signal from the controller block 2650 is used to determine the inter arrival time for the entity generator block 2610, i.e., the times at which the entity generator block produces an entity. In this manner, the rate at which entities are generated can be modified according to information from other components in the block diagram 2600.

The server block 2630 also includes a count port 2633 connected to a display block 2670 for producing a value identifying the number of entities served by the server, which can be displayed to the user via a graphical user interface associated with the display block 2670. The output signal from the controller block 2650 and the two input signals into the controller block can be connected to a scope 2680 for displaying the signals on a graph, which can be displayed to the user via a graphical user interface associated with the scope block 2680.

Figure 27:
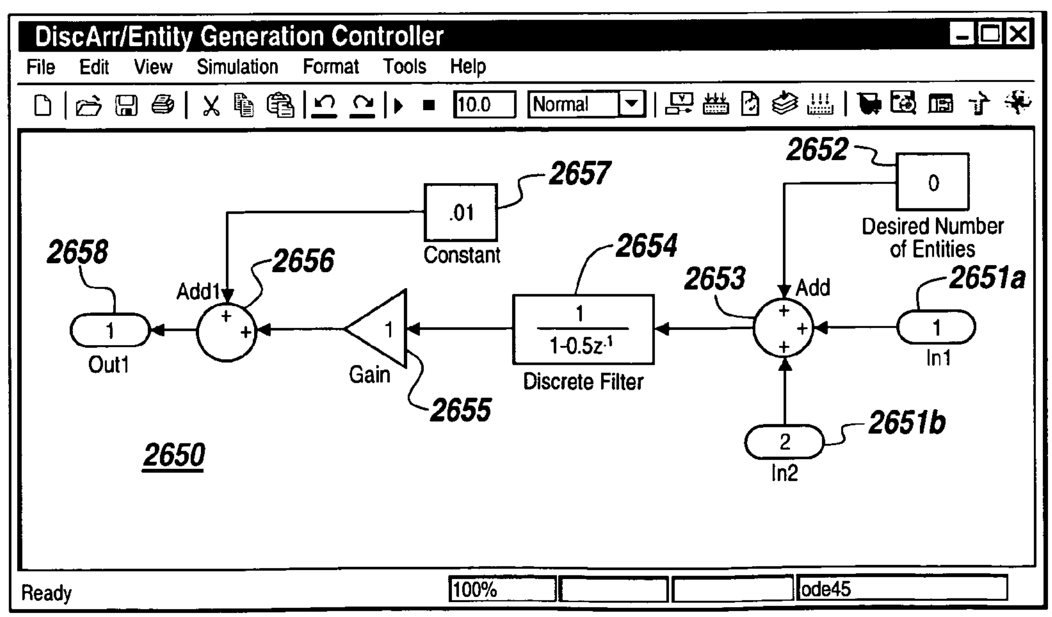
FIG. 27 diagrams an embodiment of the subsystem comprising the controller block of FIG. 26.

FIG. 27 diagrams an embodiment of the subsystem comprising the controller block 2650, which may implement time-based components in the illustrative embodiment. The controller subsystem demonstrates the use of standard discrete-time and continuous time-driven blocks, for example, as used in Simulink®, to implement the calculation of the interarrival time for the entity generator from the subsystem input signals. As shown, the controller includes first and second input ports 2651*a*, 2651*b* for receiving the signals from the server block and the queue block, respectively. A source 2652 produces a signal indicative of a desired number of entities, which is summed with the input signals at a first summing block 2653. The resulting signal passes to a discrete filter 2654, which filters the signal and a gain block 2655, which applies a gain to the signal. The resulting signal passes to a second summing block 2656, which adds the signal to a constant signal from a source block 2657 to produce the output signal, which is output via the output port 2658 and passed to the entity generator block in the discrete-time domain. The control signal is then used to control the operation of the entity generator block, specifically, the times at which the block produces each entity.

Figure 28:
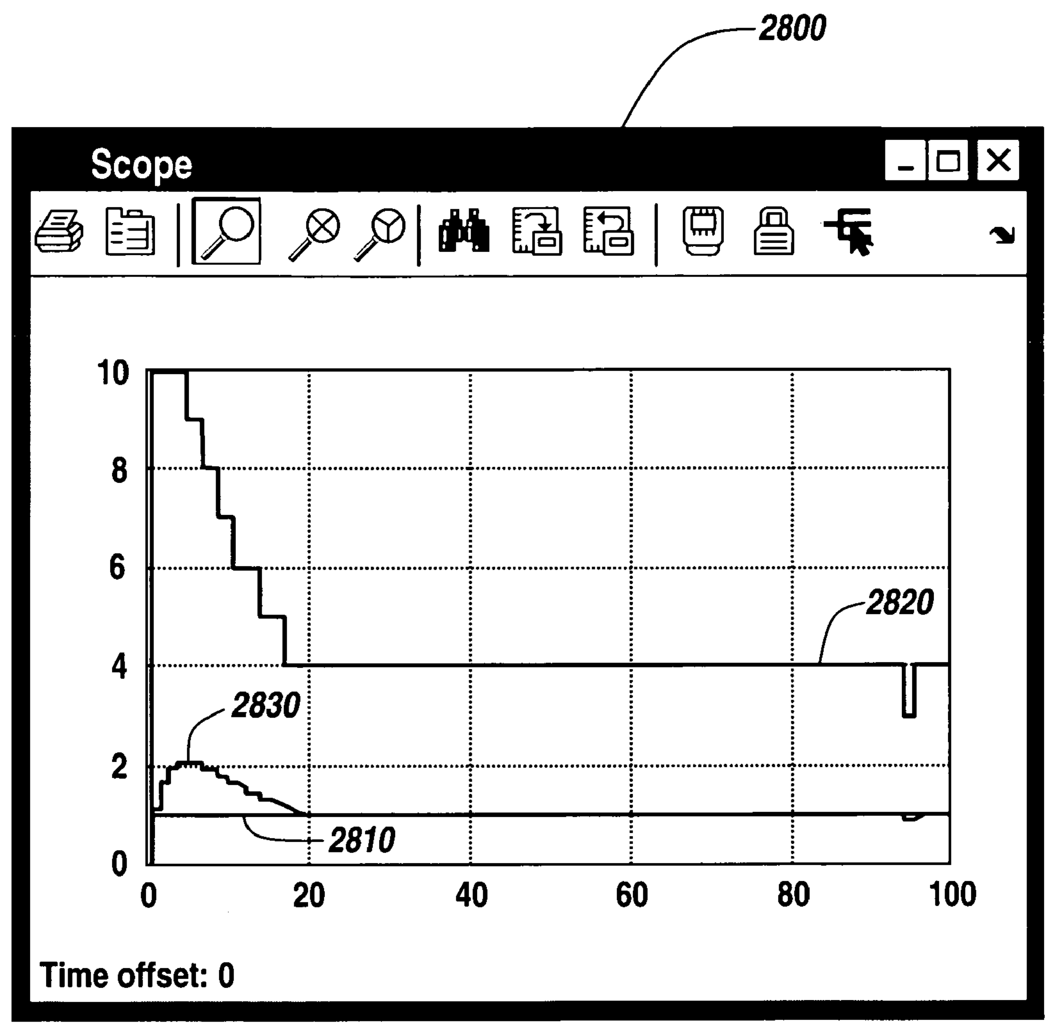
FIG. 28 illustrates a graphical user interface showing the display associated with the scope block of FIG. 26.

FIG. 28 illustrates a graphical user interface showing the display associated with the scope block 2680, which tracks the signals 2810, 2820 from the server block and queue block, respectively, and the control signal 2830 from the controller. As shown, the number of entities in the queue, represented by signal 2820, starts at zero, then increases rapidly to a relatively high value of ten, but is quickly regulated by the control signal 2830 to the desired value of four. As shown, the control signal effectively signals to the entity generator block to slow the generation of entities when an excessive number of entities are waiting in the queue block. The number of entities in the server remains constant at one. FIG. 28 thus demonstrates the effective control on entity generation during execution of the model facilitated by an embodiment of the invention.

The model of FIGS. 26-28 is merely illustrative of the use of a feedback loop in a discrete event-driven model, and is not intended to limit the invention to the particular embodiment shown herein. For example, while the operation of the controller of the feedback loop is represented by time-based blocks, one skilled in the art will recognize that the controller can have any suitable configuration. For example, the controller may comprise event-driven blocks.

In another embodiment of the invention, illustrated in FIGS. 29-32 a feedback control loop in an execution model 2900 may be implemented that includes only discrete event-driven components in the feedback portion of the model. The discrete event loop may be implemented in a model that comprises only discrete event-driven components or a hybrid model that includes both discrete event-driven components and time-driven components.

Figure 29:
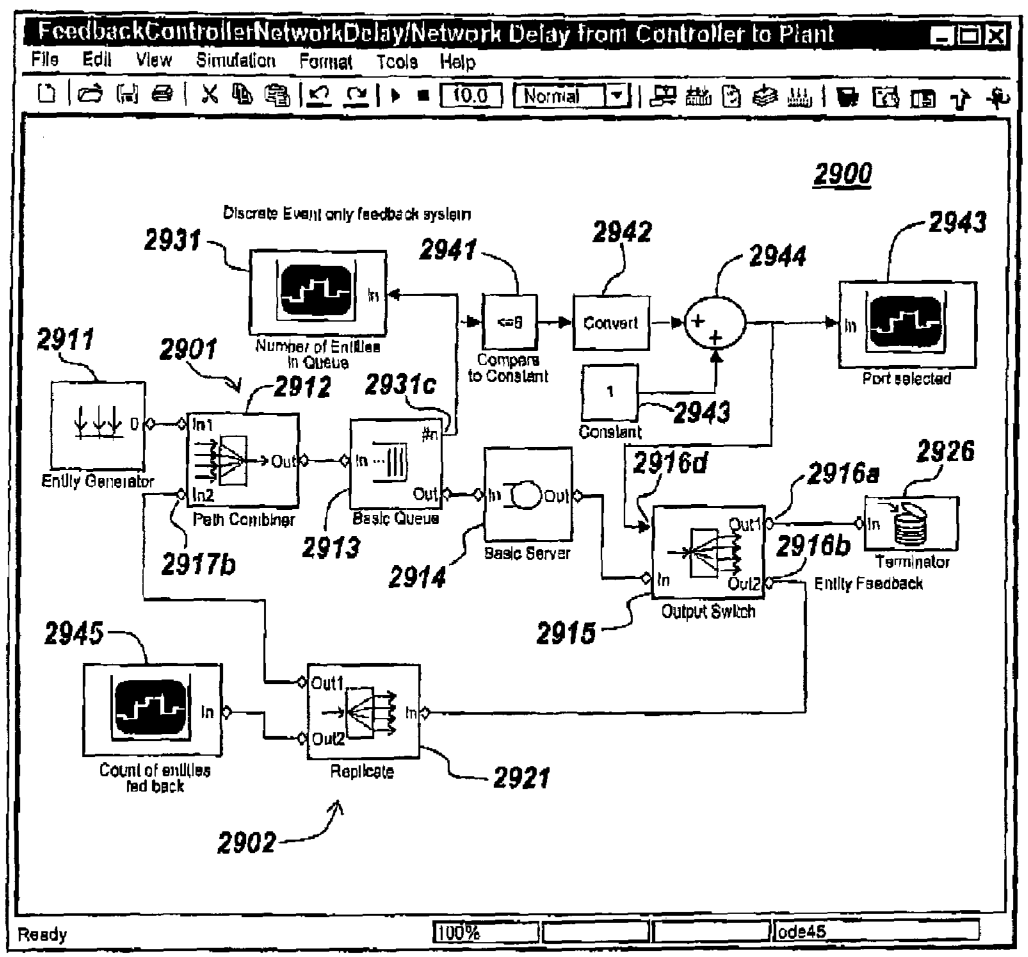
FIG. 29 illustrates an example of a discrete event model including an entity feedback loop according to an illustrative embodiment of the invention.

During execution of such a discrete event-driven feedback loop, entities are transferred immediately from an arbitrary block back to a block from which the entity originates with a time delay that may be a small as zero, i.e., an immediate transfer. FIG. 29 illustrates an example of a discrete event model 2900 including an entity feedback loop. In the illustrative model, the feedforward entity path 2901 of the model consists of an entity generator block 2911, a path combiner block 2912, a storage block, illustrated as a basic queue block 2913, a basic server block 2914, an output switch block 2915, and a terminator block 2926. The output switch-block 2915 passes entities to either the first output port 2916*a* or the second output port 2916*b* of the output switch block 2915 based on a control signal passed into the control signal input port 2916*d* on the output switch block, as described below.

When the control signal has a first value, the output switch block 2915 is configured to pass entities to the second output port 2916*b*. The entities pass along an entity feedback path 2902, which sends entities from the basic server block 2914 back to the basic queue block 2913. When the control signal has a second value, the output switch block 2915 is configured to pass entities to the first output port 2916*a*, such that the entities pass to the terminator block, which removes the entities received from the output switch block from the model. The feedback path 2902 begins with the output switch block 2915, includes a replicate block 2921, which is used for instrumentation, and ends at the path combiner block 2912. An entity arriving at the output switch block 2915 from the basic server block 2914 passes from the second output port 2916*b* of the output switch block 2915, through the replicator block 2921 and into the second inlet port 2917*b* of the path combiner block 2912. At the path combiner block, the fed back entity is combined with entities received by the path combiner block from the entity generator block 2911.

The value of the control signal for controlling the active output port of the switch block 2915 for receiving entities may depend on a parameter, such as the number of entities in the basic queue block 2913. The basic queue block 2913 includes an output port 2913*c* for producing a signal indicative of the number of entities in the basic queue block. This signal branches and passes to a queue display block 2931 and a series of blocks for producing the control signal. The series of blocks includes a "compare to constant" block 2941, which stores a threshold value and compares the number of entities in the basic queue block to the threshold value. If the number of entities is less than the threshold value, the second output port 2916*b* remains the active port, and entities continue to pass from the output switch back to the path combiner. If the number of entities is equal to or greater than the threshold value, the control signal switches the selected port to the first output port 2916*a*, such that entities pass from the output switch to the terminator block 2926. As shown, the control portion of the model also includes a convert block 2942 for converting a value from the compare to constant block. A value of one is produced if the number of entities is less than the threshold value, and a value of zero is produced if the number of entities exceeds or is equal to the threshold value. The control portion further includes a constant block 2943, which outputs a value of one, and a summation block 2944 for summing the constant value from the constant block 2943. When the constant value is combined with the value from the convert block, the resulting value, a "1" or a "2", which is the control signal, indicates which port to select, the first output port 2916*a* or the second output port 2916*b*, respectively. The control signal branches off and passes to the control signal port 2916*d* of the switch block 2915 and a port display block 2943 for displaying the selected port.

Figure 30:
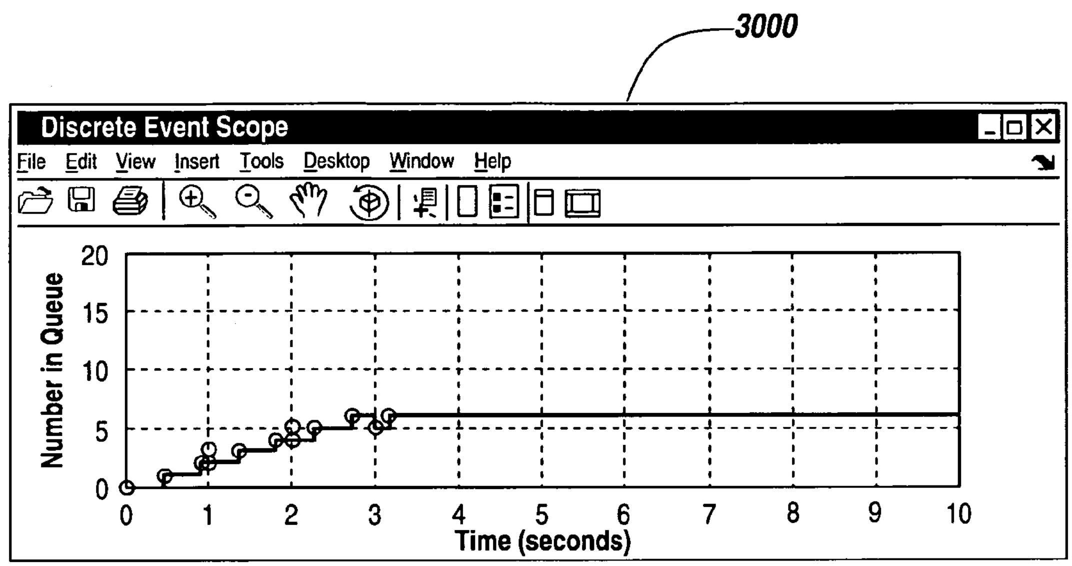
FIG. 30 is a graphical user interface associated with the queue display block in the model of FIG. 29 for displaying a graph showing the number of entities in the basic queue block over time.
Figure 31:
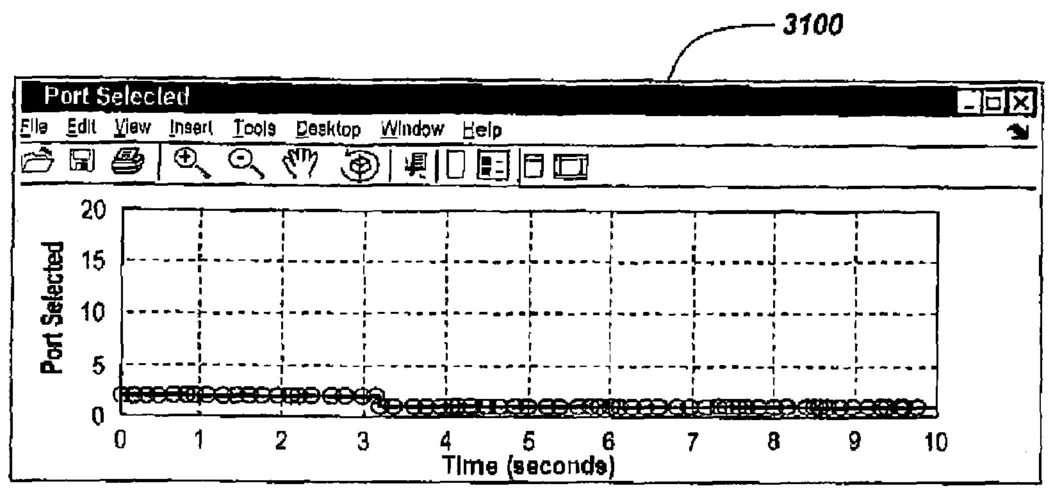
FIG. 31 is a graphical user interface associated with the port display block in the model of FIG. 29 for displaying which output port of the output switch block is selected during each event.
Figure 32:
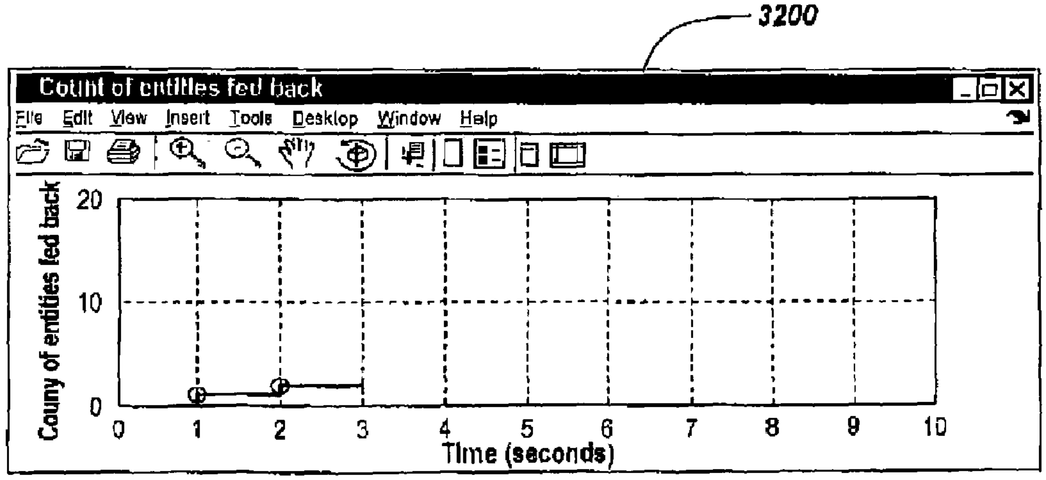
FIG. 32 is a graphical user interface associated with the replicate display block of FIG. 29.

FIG. 30 is a graphical user interface 3000 associated with the queue display block 2931 for displaying a graph showing the number of entities in the basic queue block during an execution of the model over time. As shown, for an illustrative execution, the number of entities increases with each occurrence of events over time until the threshold value of six is reached. FIG. 31 is a graphical user interface 3100 associated with the port display block 2943 for displaying which output port of the output switch block is selected during each event over the course of an execution. FIG. 32 is a graphical user interface 3200 associated with the replicate display block 2945 connected to the replicate block 2921. As shown, the number of entities sent back to the basic queue block increases during an execution of the model, until the control signal switches the active port for the output switch from the second output port 2916*b* to the first output port 2916*a*, in response to the number of entities in the basic queue block reaching a threshold value.

Discrete event blocks can also be used in any type of graphical model having feedback. The feedback is not limited to a loop and can have any suitable topology. For example, discrete event blocks may be implemented in a single feedback loop model, a multiple feedback loop model, a single feedforward model, a multiple feedforward model and models having branching of input and output paths.

Figure 33:
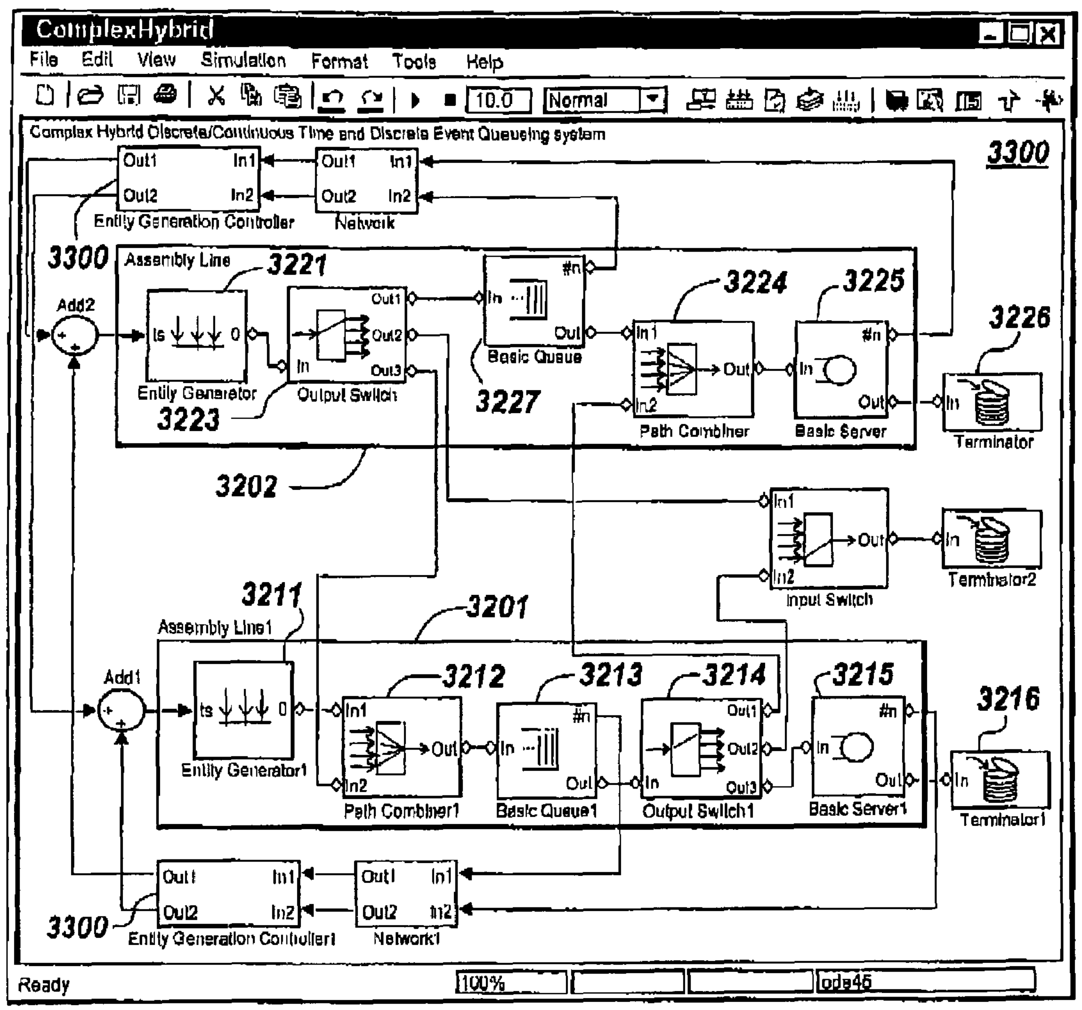
FIG. 33 illustrates a graphical model created in a discrete event execution environment that includes coupled loops that include both time-driven components as well as discrete event-driven components according to an embodiment of the invention.

For example, FIG. 33 illustrates a relatively complex graphical model 3300 created in a discrete event execution environment that includes many, highly coupled loops that include both time-driven components as well as discrete event-driven components. Because of the complexity of the model, it may be difficult to recognize which time-based signal paths constitute feedback loops for which of the discrete event-driven queuing systems. In addition, the coupling between selected components (i.e. feedback paths, feedforward paths, and switched paths) can make accurate analysis complex.

In this example, each of the illustrated discrete event paths 3201, 3202 can be considered a model of two assembly lines where at times, parts need to move from the upper assembly line to the lower assembly line to be stored (queued) and back again to be processed. As shown, the first discrete event path 3201 includes an entity generator block 3211, a path combiner block 3212 for combining entities received from the second event path 3202 with entities from the entity generator block 3211, a storage block, illustrated as a basic queue block 3213 for queuing entities, an output switch block 3214 for passing entities between one of three selected output paths via one of three output ports on the switch block 3214, a basic server block 3215 and a terminator block 3216. The second discrete event path 3202 includes an entity generator block 3221, an output switch 3223, a basic queue block 3227, a path combiner block 3224, a basic server block 3225 and a terminator block 3226. As shown, entities selectively pass between the two paths via the output switch blocks 3214 and 3223.

Figure 34:
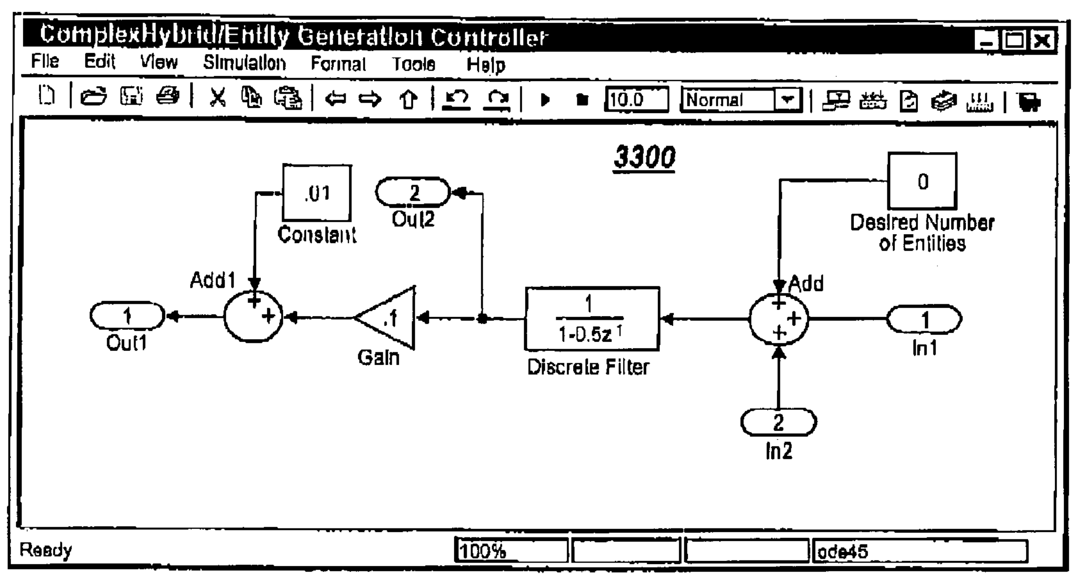
FIG. 34 illustrates a block diagram model of an embodiment of the controller subsystem of the model of FIG. 33.

The rate at which entities enter the discrete event paths 3201, 3202 is controlled by the controller subsystem 3300. The controller subsystem may be a time-based model 3300, an embodiment of which is shown in FIG. 34. One skilled in the art will recognize that the model may use any suitable components for modeling a controller used to control a parameter of discrete events components.

The degradation in the effectiveness of each of the controllers caused by the communications networks that are used to facilitate the communication of commands from the assembly line to the plant may be modeled.—In addition to the modeling problems in, for example, assembly lines, the controller and plant may be communicating using a network which introduces the difficulties in analysis described above with reference to FIGS. 24 and 25, which may also be modeled using the methods described herein.

The illustrative embodiments thus demonstrate the use of discrete event-driven modeling components to model a control system. One skilled in the art will recognize that the illustrative embodiments are exemplary of particular applications of a DES environment and that the invention is not limited to these applications.

The illustrative embodiment has been described solely for illustrative purposes relative to the technical computing environment of MATLAB® and Simulink® from The MathWorks, Inc. of Natick, Mass. Although the illustrative embodiment will be described relative to a MathWorks-based application, one of ordinary skill in the art will appreciate that the present invention may be applied to other graphical modeling environments and technical computing environments, such as any technical computing environments using software products of LabVIEW®, MATRIXx from National Instruments, Inc., Mathematica® from Wolfram Research, Inc., Mathcad of Mathsoft Engineering & Education Inc., Dymola from Dynasim AB, or Maple™ from Maplesoft, a division of Waterloo Maple Inc. Furthermore, one ordinarily skilled in the art will appreciate that the present invention may apply to any graphical modeling environment, such as one providing modeling with a Unified Modeling Language (UML), Hardware Description Language (HDL), or that provides a physics modeling domain.

The present invention has been described relative to an illustrative embodiment. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed is:

1. In a graphical modeling environment, a method for modeling a delay in a time-based graphical representation of a control system, comprising:

(a) providing, on an electronic device, a time-based graphical model of the control system that includes:

at least one time-driven execution component modeling the control system, and at least one event-driven execution component modeling the delay induced in the control system;

(b) receiving a time-based signal from the at least one time-driven execution component;

(c) transforming the time-based signal to a set of entities using the electronic device, the set of entities being objects on which the at least one event-driven execution component operates;

(d) passing the set of entities through the at least one event-driven execution component;

(e) modeling the delay in the control system by delaying the passing of one or more entities in the set of entities through the at least one event-driven execution component; and outputting a result of modeling the delay on a display.

2. The method of claim 1, wherein the entity includes at least one data structure.

3. The method of claim 1, further comprising:

transforming the set of entities to a time-based signal after the at least one event-driven execution component performs an operation on the set of entities.

4. The method of claim 1, wherein the at least one event-driven execution component comprises:

a server block for delaying each entity by a selected service time.

5. The method of claim 1, wherein the at least one event-driven execution component comprises:

an entity generator block for receiving the time-based signal and generating the set of entities;

a queue block for queuing entities generated by the entity generator block in a queue; and a server block for servicing each entity in the queue for a selected service time.

6. The method of claim 5, wherein the model further comprises a set attributes block for applying attributes to entities generated by the entity generator block.

7. The method of claim 6, wherein the set attributes block receives the time-based signal from a time-driven domain and copies values from the time-based signal to each entity passing through the set attributes block.

8. The method of claim 6, wherein the set attributes block creates the attributes with payloads containing values from the time-based signal in the time-based block diagram model.

9. The method of claim 5, wherein the model further comprises a get attribute block for receiving entities served by the server block, wherein the get attribute block extracts a payload value from a received entity, and uses the extracted payload value to update a time-based signal in the time-based block diagram model.

10. The method of claim 1, wherein the set of entities represents data packets into which the time-based signal is converted.

11. The method of claim 1, wherein the at least one event-driven execution component is disposed in a feedback loop of the model of the control system.

12. The method of claim 1, wherein the at least one event-driven execution component models a delay in the control system that is induced by multitasking of a controller.

13. The method of claim 1, wherein the at least one event-driven execution component models a delay in the control system that is induced by network latency.

14. The method of claim 1, wherein the at least one event-driven execution component models a digital controller.

15. The method of claim 1, wherein providing the time-based graphical representation of the control system comprises building a block diagram model using a modeling manager in the modeling execution environment.

16. The method of claim 1, wherein the delay is controlled by a time-driven execution component and is used to delay the execution of the at least one event-driven execution component.

17. The method of claim 1, wherein the delay is controlled by the at least one event-driven execution component and is used to delay the execution of a time-driven execution component.

18. The method of claim 1, wherein the delay is used to delay the execution of a time-driven execution component.

19. In a graphical modeling environment, a method for modeling delay in a time-based graphical representation of a control system, comprising:

providing, on an electronic device a first entity generator block, a first storage block, and a first server block in a time-based graphical model of the control system to model a delay induced in the control system; and modeling the delay induced by the control system on a first time-based signal propagating through the control system by using an electronic device to:

pass the first time-based signal into the first entity generator block;

generate a set of entities based on the first time-based signal using the first entity generator block, the set of entities being objects on which the first storage block and the first server block operate;

store the entities in the first storage block;

delay the passage of each entity in the first storage block through the first server block by servicing each entity for a service time using the first server block, the service time modeling at least a portion of the delay induced in the control system;

update the first time-based signal based on each entity served by the first server block; and output a result of modeling the delay on a display.

20. The method of claim 19, wherein the first storage block is a queue block for queuing entities.

21. The method of claim 19, wherein the delay is controlled by a time-driven execution component and is used to delay the execution of an event-driven execution component.

22. The method of claim 19, wherein the delay is controlled by an event-driven execution component and is used to delay the execution of a time-driven execution component.

23. The method of claim 19, wherein the delay is used to delay the execution of a time-driven execution component.

24. The method of claim 19, wherein the first entity generator block, the first storage block and the first server block are disposed in a feedback path of the graphical representation of the control system.

25. The method of claim 19, further comprising applying attributes to the set of entities based on values from the time-based signal before queuing the entities.

26. The method of claim 25, wherein updating the first time-based signal comprises extracting the values in the attributes applied to the set of entities.

27. The method of claim 19, wherein the selected service time models a delay in the control system that is induced by multitasking of a controller.

28. The method of claim 19, wherein the selected service time models a delay in the control system that is induced by network latency.

29. A computer-readable storage medium holding computer-executable instructions for modeling a delay in a time-based graphical representation of a control system, the medium holding instructions for:

(a) providing, on an electronic device, a time-based graphical model of the control system that includes:

at least one time-driven execution component modeling the control system, and at least one event-driven execution component modeling the delay induced in the control system;

(b) receiving a time-based signal from the at least one time-driven execution component;

(c) transforming the time-based signal to a set of entities using the electronic device, the set of entities being objects on which the at least one event-driven execution component operates;

(d) passing the set of entities through the at least one event-driven execution component;

(e) modeling the delay in the control system by delaying the passing of one or more entities in the set of entities through the at least one event-driven execution component; and outputting a result of modeling the delay.

30. A computer-readable storage medium holding computer-executable instructions for modeling delay in a time-based graphical representation of a control system, the medium holding instructions for:

providing, on an electronic device, a first entity generator block, a first storage block, and a first server block in a time-based graphical model of the control system to model a delay induced in the control system; and modeling the delay induced by the control system on a first time-based signal propagating through the control system by using an electronic device to:

pass the first time-based signal into the first entity generator block;

generate a set of entities based on the first time-based signal using the first entity generator block, the set of entities being objects on which the first storage block and the first server block operate;

store the entities in the first storage block;

delaying the passage of each entity in the first storage block through the first server block by servicing each entity for a service time using the first server block, the service time modeling at least a portion of the delay induced in the control system;

updating the first time-based signal based on each entity served by the first server block; and outputting a result of modeling the delay on a display.

* * * * *